US012574995B2

(12) United States Patent
Leng et al.

(10) Patent No.: US 12,574,995 B2
(45) Date of Patent: Mar. 10, 2026

(54) DISCONTINUOUS RECEPTION COMMUNICATION METHOD AND TERMINAL DEVICE

(71) Applicant: GUANGDONG OPPO MOBILE TELECOMMUNICATIONS CORP., LTD., Dongguan (CN)

(72) Inventors: Bingxue Leng, Dongguan (CN); Qianxi Lu, Dongguan (CN); Zhongda Du, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 318 days.

(21) Appl. No.: 18/214,425

(22) Filed: Jun. 26, 2023

(65) Prior Publication Data

US 2023/0337320 A1      Oct. 19, 2023

Related U.S. Application Data

(63) Continuation of application No. PCT/CN2021/110100, filed on Aug. 2, 2021.

(30) Foreign Application Priority Data

Aug. 2, 2021     (WO) ................ PCT/CN2021/110100

(51) Int. Cl.
*H04W 76/28*        (2018.01)
*H04L 1/08*          (2006.01)
(Continued)

(52) U.S. Cl.
CPC ............... *H04W 76/28* (2018.02); *H04L 1/08* (2013.01); *H04L 1/1812* (2013.01); *H04L 5/0053* (2013.01)

(58) Field of Classification Search
CPC ............. H04W 76/28; H04W 52/0216; H04W 52/0219; H04W 52/0229; H04W 52/0235;
(Continued)

(56) References Cited

U.S. PATENT DOCUMENTS

2011/0237231 A1     9/2011  Horneman et al.
2011/0305215 A1     12/2011  Hofmann et al.
(Continued)

FOREIGN PATENT DOCUMENTS

CN           101009537 A      8/2007
CN           103532684 B      1/2017
(Continued)

OTHER PUBLICATIONS

Extended European Search Report issued in corresponding European application No. 21913085.3, mailed May 28, 2024.
(Continued)

*Primary Examiner* — Afshawn M Towfighi
(74) *Attorney, Agent, or Firm* — BAYES PLLC

(57) ABSTRACT

A wireless communication method and a terminal device are provided. The method includes: receiving, by a first terminal, a first message sent by a second terminal; obtaining a target physical identifier and/or a target Media Access Control (MAC) layer identifier in the first message; and performing a Discontinuous Reception (DRX) operation according to the target physical layer identifier and/or the target MAC layer identifier.

16 Claims, 7 Drawing Sheets

100

(51) Int. Cl.
　　　H04L 1/1812　　　(2023.01)
　　　H04L 5/00　　　(2006.01)
(58) Field of Classification Search
　　　CPC ........... H04W 52/0274; H04W 52/028; H04W
　　　　　　　　　76/11; H04W 72/231; H04W 72/25;
　　　　　　　H04W 72/40; H04L 1/08; H04L 1/1812;
　　　　　　　　　　H04L 5/0053; H04L 1/1822; H04L
　　　　　　　1/1848; H04L 1/1854; H04L 1/188; Y02D
　　　　　　　　　　　　　　　　　　　　　30/70
　　　See application file for complete search history.

(56) References Cited

U.S. PATENT DOCUMENTS

| | | | | |
|---|---|---|---|---|
| 2016/0219475 | A1* | 7/2016 | Kim ....................... | H04W 76/19 |
| 2017/0163388 | A1* | 6/2017 | Wiemann .............. | H04L 1/1851 |
| 2017/0289940 | A1 | 10/2017 | Yang et al. | |
| 2018/0110085 | A1 | 4/2018 | Tseng | |
| 2021/0212099 | A1* | 7/2021 | Yi ......................... | H04W 72/23 |
| 2023/0098973 | A1* | 3/2023 | Yang ..................... | H04W 72/25 |
| | | | | 370/312 |

FOREIGN PATENT DOCUMENTS

| | | | |
|---|---|---|---|
| CN | 106465041 | A | 2/2017 |
| CN | 107241678 | A | 10/2017 |
| CN | 107306423 | A | 10/2017 |
| CN | 111466151 | A | 7/2020 |
| CN | 111480391 | A | 7/2020 |
| CN | 111556590 | A | 8/2020 |
| CN | 111670603 | A | 9/2020 |
| CN | 111699723 | A | 9/2020 |
| CN | 111800893 | A | 10/2020 |
| CN | 111886904 | A | 11/2020 |
| WO | 2018064477 | A1 | 4/2018 |
| WO | 2020077643 | A1 | 4/2020 |
| WO | 2020256462 | A1 | 12/2020 |

OTHER PUBLICATIONS

Priority Review issued in corresponding Chinese application No. 202310815798.4, mailed Jul. 31, 2024.
First Office Action issued in corresponding Chinese application No. 202310815798.4, mailed Aug. 13, 2024.
Source: Huawei, HiSilicon; Title: Discussion on remaining MAC open issues for 5G V2X with NR SL 3GPP TSG-RAN WG2 Meeting #110 electronic R2-2005492 Jun. 1-12, 2020.
Source: LG Electronics; Title: Discussion on physical layer design considering sidelink DRX operation 3GPP TSG RAN WG1 #103-e R1-2007897 E-Meeting, Oct. 26-Nov. 13, 2020.
Second Examination Opinion Notice issued in corresponding Chinese Application No. 202310815798.4, mailed on Oct. 31, 2024, 14 pages.
Decision of Rejection issued in corresponding Chinese Application No. 202310815798.4, mailed on Jan. 10, 2025, 18 pages.
"Discussion on physical layer procedures for sidelink in NR V2X", Source: Panasonic, Agenda Item: 7.2.4.5, 3GPP TSG RAN WG1 #99, R1-1912754, Reno, US, Nov. 18-22, 2019, 6 pages.
"On Layer 1 IDs", Source: Ericsson, Agenda Item: 7.2.4.8, 3GPP TSG-RAN WG1 Meeting #97, R1-1907152, Reno, Nevada, U.S., May 13-17, 2019, 4 pages.
"On lower layer IDs", Source: Ericsson, Agenda Item: 11.4.2, 3GPP TSG-RAN WG2 #106 TDoc R2-1907347, Reno, USA, May 13-17, 2019, 3 pages.
Communication pursuant to Article 94(3) PEC issued in corresponding European Application No. 21913085.3, mailed on Jan. 29, 2025, 8 pages.
International Search Report issued in international application No. PCT/CN2020/142186, mailed Sep. 27, 2021.
Written Opinion of the International Searching Authority issued in international application No. PCT/CN2020/142186, mailed Sep. 27, 2021.
International Search Report issued in international application No. PCT/CN2021/110100, mailed Oct. 14, 2021.
Written Opinion of the International Searching Authority issued in international application No. PCT/CN2021/110100, mailed Oct. 14, 2021.
Vivo, "Uu/SL DRX impact to resource allocation mode 1 and mode 2", R2-2009834, 3GPP TSG-RAN WG2 Meeting #112 electronic Online, Nov. 2-13, 2020.
Xiaomi, "Discussion on sidelink DRX timer handling", R2-2010468, 3GPP TSG-RAN WG2 Meeting #112e Electronic Nov. 2-13, 2020.
CATT, "Discussion on Sidelink DRX", R2-2008850, 3GPP TSG-RAN WG2 Meeting #112-e Electronic, Nov. 2-Nov. 13, 2020.
International Search Report issued in international application No. PCT/CN2021/078729, mailed Sep. 29, 2021.
Written Opinion of the International Searching Authority issued in international application No. PCT/CN2021/078729, mailed Sep. 28, 2021.
3GPP TS 38.321 V16.2.1 (Sep. 2020); Technical Specification Group Radio Access Network; NR; Medium Access Control (MAC) protocol specification (Release 16).

\* cited by examiner

100

DISCONTINUOUS RECEPTION COMMUNICATION METHOD AND TERMINAL DEVICE

CROSS-REFERENCE TO RELATED APPLICATIONS

The present application is a continuation of International Application No. PCT/CN2021/110100, filed on Aug. 2, 2021, which claims the benefit of priority to International Application No. PCT/CN2020/142186, filed on Dec. 31, 2020 and entitled "WIRELESS COMMUNICATION METHOD AND TERMINAL DEVICE", both of which are incorporated herein by reference in their entireties.

TECHNICAL FIELD

Embodiments of the present disclosure relate to the communication technical field, and more specifically, to a wireless communication method and a terminal device.

BACKGROUND

In uplink and downlink communications, a terminal device may save power based on the Discontinuous Reception (DRX) technology. In sidelink communications, some terminal devices also need to save power. Therefore, how to realize terminal power saving in sidelink communications is an urgent problem to be solved.

SUMMARY

Embodiments of the present disclosure provide a wireless communication method and a terminal device, which are beneficial to realize the purpose of terminal power saving in the sidelink.

In a first aspect, there is provided a wireless communication method, including:

receiving, by a first terminal, a first message sent by a second terminal;
    obtaining a target physical identifier and/or a target Media Access Control (MAC) layer identifier in the first message; and
    performing a Discontinuous Reception (DRX) operation according to the target physical layer identifier and/or the target MAC layer identifier.

In a second aspect, there is provided a wireless communication method, including:

sending, by a second terminal, a first message to a first terminal;
    starting, by the second terminal, a fourth timer in a case where a first condition is met; and
    during running of the fourth timer, retransmitting, by the second terminal, the first message or sending a second message.

In a third aspect, there is provided a terminal device. The terminal device is configured to perform the method in the foregoing first aspect or various implementations of the first aspect.

Specifically, the terminal device includes functional module(s) configured to perform the method in the above first aspect or various implementations of the first aspect.

In a fourth aspect, there is provided a terminal device. The terminal device is configured to perform the method in the foregoing second aspect or various implementations of the second aspect.

Specifically, the terminal device includes functional module(s) configured to perform the method in the above second aspect or various implementations of the second aspect.

In a fifth aspect, there is provided a terminal device, including a processor and a memory. The memory is configured to store a computer program, and the processor is configured to call and run the computer program stored in the memory to perform the method in the above first aspect or various implementations of the first aspect.

In a sixth aspect, there is provided a terminal device, including a processor and a memory. The memory is configured to store a computer program, and the processor is configured to call and run the computer program stored in the memory to perform the method in the above second aspect or various implementations of the second aspect.

In a seventh aspect, there is provided a chip for implementing the method in any one of the above first aspect to the second aspect or in each implementation of the first or second aspect.

Specifically, the chip includes: a processor configured to call and run a computer program from a memory to cause an apparatus in which the device is installed to perform the method in any one of the above first aspect to the second aspect or in each implementation of the first or second aspect.

In an eighth aspect, there is provided a computer-readable storage medium for storing a computer program, and the computer program causes a computer to perform the method in any one of the above first aspect to the second aspect or in each implementation of the first or second aspect.

In a ninth aspect, there is provided a computer program product, including computer program instructions. The computer program instructions cause a computer to perform the method in any one of the above first aspect to the second aspect or in each implementation of the first or second aspect.

In a tenth aspect, there is provided a computer program, which, when running on a computer, causes the computer to perform the method in any one of the above first aspect to the second aspect or in each implementation of the first or second aspect.

Through the above technical solutions, the first terminal can perform the DRX operation according to the physical layer identifier and/or the MAC layer identifier in the received message, which is beneficial to realize the purpose of terminal power saving in the sidelink.

DETAILED DESCRIPTION

Figure 1:
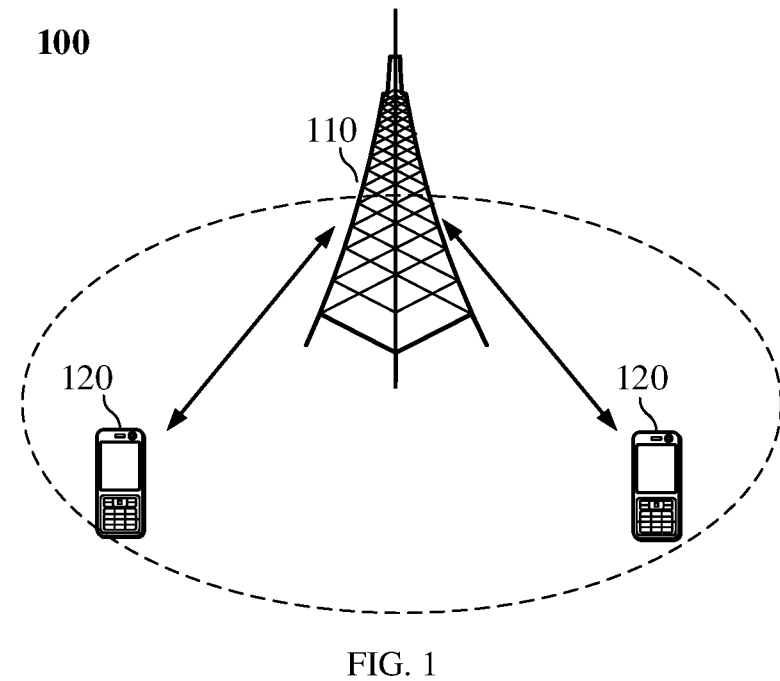
FIG. 1 is a schematic diagram of a communication system architecture according to an embodiment of the present disclosure.

The technical solutions in embodiments of the present disclosure will be described below with reference to the drawings in the embodiments of the present disclosure. Obviously, the described embodiments are part of the embodiments of the present application, but not all of the embodiments. With regard to the embodiments in this application, all other embodiments obtained by persons of ordinary skill in the art without making creative efforts belong to the scope of protection of this application.

Technical solutions according to embodiments of the present disclosure may be applied to various communication systems, such as, Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR) system, evolution system of NR system, LTE-based access to unlicensed spectrum (LTE-U) system, NR-based access to unlicensed spectrum (NR-U) system, Non-Terrestrial Networks (NTN) system, Universal Mobile Telecommunication System (UMTS), Wireless Local Area Networks (WLAN), Wireless Fidelity (WiFi), 5th-Generation (5G) system, or other communication systems, etc.

Generally speaking, traditional communication systems support a limited number of connections and are easy to implement. However, with the development of communication technologies, mobile communication systems will not only support traditional communications, but also support, for example, Device to Device (Device to Device, D2D) communications, Machine to Machine (M2M) communications, Machine Type Communication (MTC), Vehicle to Vehicle (V2V) communications, or Vehicle to everything (V2X), etc. Embodiments of the present disclosure may be applied to these communications systems.

Optionally, the communication systems in embodiments of the present disclosure may be applied to a Carrier Aggregation (CA) scenario, may also be applied to a Dual Connectivity (DC) scenario, and may also be applied to a standalone (SA) network deployment scenario.

Optionally, the communication system in embodiments of the present disclosure may be applied in unlicensed spectrum. The unlicensed spectrum may also be considered as shared spectrum. Or, the communication system in embodiments of the present disclosure may also be applied in licensed spectrum. The licensed spectrum may also be considered as non-shared spectrum.

Embodiments of the present disclosure are described in combination with a terminal device and a network device. The terminal device may also be called User Equipment (UE), access terminal, user unit, user station, mobile station, mobile terminal, remote station, remote terminal, mobile device, user terminal, terminal, wireless communication device, user agent or user device, etc.

The terminal device may be a station (ST) in a WLAN, a cellular phone, a cordless phone, a Session Initiation Protocol (SIP) phone, a Wireless Local Loop (WLL) station, or a Personal Digital Assistant (PDA) device, a handheld device with wireless communication capabilities, a computing device or other processing device connected to a wireless modem, a vehicle-mounted device, a wearable device, or a terminal device in a next-generation communication system, such as a terminal device in the NR network or a terminal device in a future evolved Public Land Mobile Network (PLMN) network.

In embodiments of the present disclosure, the terminal device may be deployed on land, including indoor or outdoor, handheld, wearable or vehicle-mounted; or, the terminal device may be deployed on water (such as on ships, etc.); or, the terminal device may be deployed in the air (such as on aircraft, balloons, and satellites, etc.).

In embodiments of the present disclosure, the terminal device may be a mobile phone, a tablet computer (Pad), a computer with wireless transceiver function, a virtual reality (VR) terminal device, an augmented reality (AR) terminal device, a wireless terminal device in industrial control, a wireless terminal device in self driving, a wireless terminal devices in remote medical, a wireless terminal device in smart grid, a wireless terminal device in transportation safety, a wireless terminal device in smart city, or a wireless terminal device in smart home, etc.

By way of example and not limitation, in embodiments of the present disclosure, the terminal device may also be a wearable device. The wearable device may also be referred to as a wearable smart device, which is a general term for applying wearable technology to intelligently design everyday wear and develop wearable devices, such as glasses, gloves, watches, clothing and shoes. A wearable device is a portable device that is worn directly on the body or integrated into users' clothes or accessories. The wearable device is not only a hardware device, but also realize powerful functions through software support, data interaction, and cloud interaction. Generalized wearable smart devices include full-featured and large-sized devices which may realize complete or partial functions that do not depend on smart phones, such as smart watches or smart glasses, and devices that only focus on a certain type of application functions, and need to cooperate with other devices like smart phones, such as smart bracelets for sign monitoring, or smart jewelry.

In embodiments of the present disclosure, the network device may be a device for communicating with a mobile device. The network device may be an Access Point (AP) in WLAN, a base station (BTS, Base Transceiver Station) in GSM or CDMA, or a base station (NB, NodeB) in WCDMA, an evolved base station in LTE (Evolutional Node B, eNB or eNodeB), or a relay station or an access point, or a vehicle-mounted device, a wearable device, a network device (gNB) in an NR network, or a network device in future evolved PLMN network or a network device in a NTN network.

By way of example and not limitation, in embodiments of the present disclosure, the network device may have mobile characteristics, for example, the network device may be a mobile device. Optionally, the network device may be a satellite, or a balloon station. For example, the satellite may be a Low Earth Orbit (LEO) satellite, a Medium Earth Orbit (MEO) satellite, a Geostationary Earth Orbit (GEO) satellite, or a High Elliptical Orbit (HEO) satellite, etc. Optionally, the network device may also be a base station deployed on land, or water, etc.

In embodiments of the present disclosure, the network device provides services for a cell, and the terminal device communicates with the network device through transmission resources (for example, frequency domain resources, or spectrum resources) used by the cell. The cell may be a cell corresponding to the network device (for example, base station). The cell may belong to a macro base station or a base station corresponding to a small cell. The small cell here may include: a metro cell, a micro cell, a pico cell, a femto cell, etc. These small cells have the characteristics of small coverage and low transmit power, and are suitable for providing high-speed data transmission services.

Exemplarily, a communication system 100 in which embodiments of the present disclosure may be applied is shown in FIG. 1. The communication system 100 may include a network device 110, and the network device 110 may be a device for communicating with a terminal device 120 (or called a communication terminal, terminal). The network device 110 may provide communication coverage for a specific geographical area, and may communicate with terminal devices in the coverage area.

FIG. 1 exemplarily shows one network device and two terminal devices. Optionally, the communication system 100 may include multiple network devices and each network device may include other numbers of terminal devices within the coverage area, and embodiments of the present disclosure do not impose specific limitations on this.

Optionally, the communication system 100 may further include other network entities such as a network controller or a mobility management entity, which is not limited in embodiments of the present disclosure.

It should be understood that a device having a communication function in the network/system in embodiments of the present disclosure may be referred to as a communication device. Taking the communication system 100 shown in FIG. 1 as an example, the communication device may include a network device 110 and terminal devices 120 with a communication function, and the network device 110 and the terminal devices 120 may be the specific devices in embodiments of the present disclosure, which will not be repeated here. The communication device may further include other devices in the communication system 100, such as other network entities like a network controller or a mobility management entity, which are not limited in embodiments of the present disclosure.

It should be understood that the terms "system" and "network" are often used interchangeably herein. The term "and/or" herein is only an association relationship to describe associated objects, indicating that there may be three kinds of relationships, for example, A and/or B may mean three cases: A alone, B alone, and A and B together. In addition, the character "/" herein generally indicates that the related objects are an "or" relationship.

It is to be understood that "indication/indicate" referred to in embodiments of the present disclosure may be a direct indication, an indirect indication, or representing an association relationship. For example, A indicates B may mean that A indicates B directly, for example, B may be obtained through A; or A indicates B may mean that A indicates B indirectly, for example, A indicates C and B may be obtained through C; or, A indicates B may mean that A and B have an association relationship.

In the description of embodiments of the present disclosure, the term "correspond/corresponding" may indicate a direct correspondence or indirect correspondence between two objects, or may indicate an association relationship between the two objects, or may be a relationship of indicating and being indicated, configuring and being configured, etc.

In embodiments of the present disclosure, "predefinition/predefined" may be realized by pre-saving a corresponding code, table or other methods that may be used to indicate related information in a device (for example, including a terminal device and a network device). The specific implementation method is not limited in embodiments of the present disclosure. For example, predefinition/predefined may refer to being defined in a protocol.

In embodiments of the present disclosure, a "protocol" may refer to a standard protocol in the communication field, for example, it may include the LTE protocol, the NR protocol, or related protocols applied in future communication systems, which is not limited in the present disclosure.

In some scenarios, for the purpose of terminal power saving, the concept of DRX is proposed. Specifically, a network device may configure a terminal device to wake up at a time predicted by the network (DRX ON) and monitor PDSCH, and the network may also configure the terminal device to sleep at a time predicted by the network (DRX OFF), that is, the terminal device does not need to monitor the PDCCH. Therefore, if the network device 120 has data to be transmitted to the terminal device 110, the network device 120 may schedule the terminal device 110 during the time when the terminal device 110 is in DRX ON, and during the DRC OFF time, due to the radio frequency being turned off, terminal power consumption may be reduced.

Figure 2:
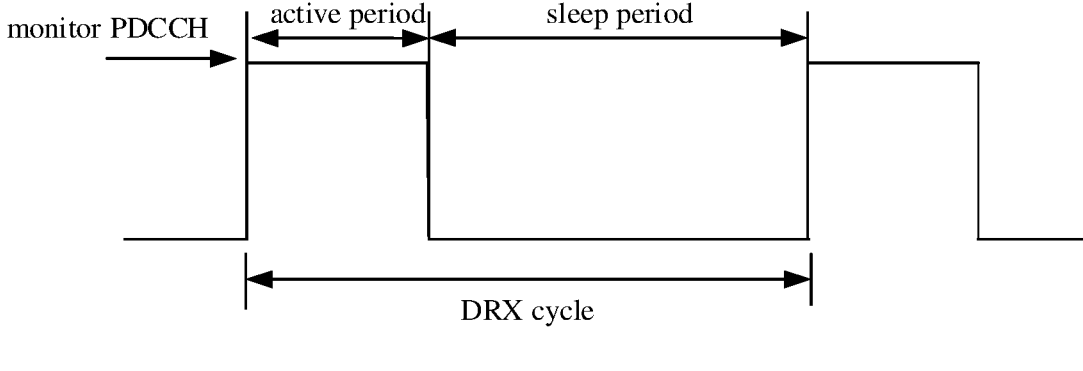
FIG. 2 is a schematic diagram of a DRX cycle.

As shown in FIG. 2, a DRX cycle configured by a network device for a terminal device consists of an active period (On Duration) and a sleep period (Opportunity for DRX). In RRC CONNECTED mode, if the terminal device is configured with the DRX function, during the On Duration time, the terminal device monitors and receives the PDCCH; the terminal device does not monitor the PDCCH during the sleep period to reduce power consumption.

It should be understood that the terminal device in the sleep period in the embodiments of the present disclosure does not receive the PDCCH, but may receive data from other physical channel(s). The embodiments of the present disclosure are not specifically limited. For example, the terminal device may receive a Physical Downlink Shared Channel (PDSCH), an acknowledgment/negative-acknowledgement (ACK/NACK), or the like. For another example, in Semi-Persistent Scheduling (SPS), the terminal device may receive periodically configured PDSCH data.

In some embodiments, a DRX function may be configured for a Media Access Control (MAC) entity through Radio Resource Control (RRC) to control the behavior of the terminal device to monitor the PDCCH. That is, each MAC entity may correspond to a DRX configuration. Optionally, a DRX configuration may include at least one of the following:

DRX on duration timer (drx-onDurationTimer): the duration for the terminal device to wake up at the beginning of a DRX Cycle;

DRX slot offset (drx-SlotOffset): the delay for the terminal device to start drx-onDurationTimer;

DRX inactivity timer (drx-InactivityTimer): the duration for the terminal device to continue to monitor the PDCCH after the terminal device receives a PDCCH indicating uplink initial transmission or downlink initial transmission;

DRX downlink retransmission timer (drx-RetransmissionTimerDL): the longest duration for the terminal device to monitor a PDCCH indicating downlink retransmission scheduling; each downlink HARQ process except a broadcast HARQ process corresponds to one drx-RetransmissionTimerDL;

DRX uplink retransmission timer (drx-RetransmissionTimerUL): the longest duration for a terminal device to monitor a PDCCH indicating uplink retransmission scheduling; each uplink HARQ process corresponds to one drx-RetransmissionTimerUL;

long DRX cycle start offset (drx-LongCycleStartOffset): used to configure a long DRX cycle, and a subframe offset of the start of the long DRX cycle and a short DRX cycle;

short DRX cycle (drx-ShortCycle): the short DRX cycle is optional;

short cycle timer (drx-ShortCycleTimer): the duration when the terminal device is in the short DRX cycle (and the terminal device does not receive any PDCCH), which is optional configuration;

DRX downlink Hybrid Automatic Repeat reQuest (HARQ) Round Trip Time (RTT) Timer (drx-HARQ-RTT-TimerDL) minimum waiting time before a PDCCH indicating downlink scheduling is expected by the terminal device; each downlink HARQ process except the broadcast HARQ process corresponds to one drx-HARQ-RTT-TimerDL;

DRX uplink Hybrid Automatic Repeat reQuest (HARQ) Round Trip Time (RTT) Timer (drx-HARQ-RTT-TimerUL) minimum waiting time before a PDCCH indicating uplink scheduling is expected by the terminal device; each uplink HARQ process corresponds to a drx-HARQ-RTT-TimerUL.

If the terminal device is configured with DRX, the terminal device needs to monitor the PDCCH during the DRX active time (active time). DRX active time includes the following situations:

any one of drx-onDurationTimer, drx-InactivityTimer, drx-RetransmissionTimerDL, drx-RetransmissionTimerUL and random access contention resolution timer (ra-ContentionResolutionTimer) is running;

the terminal device has sent a SR on a PUCCH and is in a pending state;

PDCCH indicates a new transmission.

In uplink and downlink communications, a terminal device may realize terminal power saving based on the above-mentioned DRX technology. For example, when the terminal device receives PDCCH including a physical layer identifier of the terminal device itself, such as, Cell Radio Network Temporary Identity (C-RNTI), CI-RNTI, pre-configured scheduling radio network temporary identifier (Configured Scheduling RNTI, CS-RNTI), INT-RNTI, SFI-RNTI, and so on, the terminal device may perform a corresponding DRX operation, such as starting an inactivity timer (drx-InactivityTimer) or a retransmission timer (drx-RetransmissionTimer), etc.

In sidelink communications, some terminal devices also have power saving requirements. Therefore, how to realize terminal power saving in sidelink communications is an urgent problem to be solved.

In order to facilitate understanding of the technical solutions of the embodiments of the present disclosure, the technical solutions of the present disclosure are described in detail below through specific examples. As optional solutions, the above related technologies may be combined with the technical solutions of the embodiments of the present disclosure in any manner, and all of such combinations fall within the protection scope of the embodiments of the present disclosure. The embodiment of the present disclosure includes at least part of the following contents.

Figure 3:
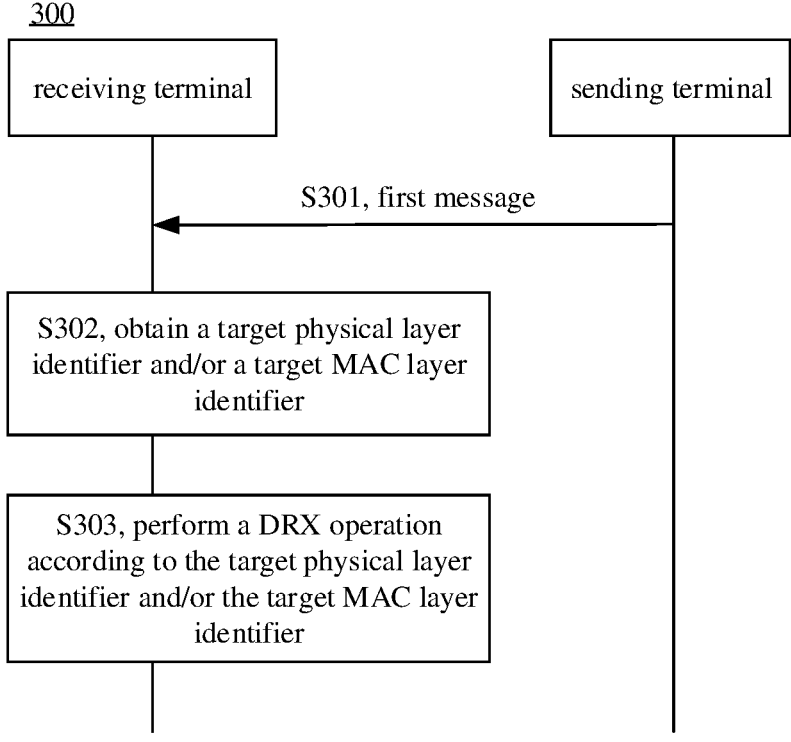
FIG. 3 is a schematic interaction diagram of a wireless communication method according to an embodiment of the present disclosure.

FIG. 3 is a schematic interaction diagram of a wireless communication method 300 according to an embodiment of the present disclosure. As shown in FIG. 3, the method 300 includes the following content:

In S301, a first terminal receives a first message sent by a second terminal.

In S302, a target physical layer identifier and/or a target MAC layer identifier in the first message are obtained.

In S303, a discontinuous reception (DRX) operation is performed according to the target physical layer identifier and/or the target MAC layer identifier.

In some embodiments of the present disclosure, the first terminal is also called a sending terminal, and the second terminal is also called a receiving terminal.

Optionally, in some embodiments, the first message may be received when the DRX on duration timer is in a running state, or the first message may be received after the DRX on duration timer expires.

Optionally, in some embodiments, the first message may include Physical Sidelink Control Channel (PSCCH), and Physical Sidelink Shared Channel (PSSCH) corresponding to the PSCCH.

Optionally, in some embodiments, the physical layer identifier may include a physical layer address. The physical layer identifier is also called a layer 1 identifier (L1 ID).

Optionally, in some embodiments, the MAC layer identifier may include a MAC address. The MAC layer identifier is also called a layer 2 identifier (L2 ID).

In some embodiments, the PSCCH may include first-stage Sidelink Control Information (SCI), and the PSSCH may include a second-stage SCI.

In some embodiments, the first terminal may decode the first message to obtain the target physical layer identifier. For example, the SCI in the first message is decoded to obtain the target physical layer identifier.

In some embodiments, the first terminal may acquire the target MAC identifier from a Media Access Control Protocol Data Unit (MAC PDU) in the first message.

In some embodiments, if the target physical layer identifier is consistent with a physical layer identifier of the first terminal, the first terminal starts a first timer and enters a DRX active state. The first terminal is in the DRX active state during running of the first timer.

In some embodiments, if the target MAC layer identifier is not consistent with a MAC layer identifier of the first terminal, the first terminal turns off the first timer, and the first terminal is in a DRX sleep state.

In some other embodiments, if the target physical layer identifier is consistent with the physical layer identifier of the first terminal and the target MAC layer identifier is consistent with the MAC layer identifier of the first terminal, the first terminal starts the first timer. The first terminal is in the DRX active state during running of the first timer.

It should be understood that embodiments of the present disclosure do not specifically limit the number of physical layer identifier(s) included in the target physical layer identifier. For example, target physical layer identifier may include a physical layer identifier of one terminal, or may include physical layer identifiers of multiple terminals, or may include physical layer identifier(s) of one terminal group, or may include physical layer identifiers of multiple terminal groups.

Optionally, in some embodiments of the present disclosure, the target physical layer identifier being consistent with the physical layer identifier of the first terminal may mean that the target physical layer identifier includes the physical layer identifier of the first terminal, or that the target physical layer identifier is the same as the physical layer identifier of the first terminal.

Optionally, in some embodiments of the present disclosure, the target physical layer identifier being not consistent with the physical layer identifier of the first terminal may mean that the target physical layer identifier does not include the physical layer identifier of the first terminal, or that the target physical layer identifier is different from the physical layer identifier of the first terminal.

Optionally, in some embodiments of the present disclosure, the target MAC identifier being consistent with a MAC identifier of the first terminal may mean that the target MAC identifier includes the MAC identifier of the first terminal, or that the target MAC identifier is the same as the MAC identifier of the first terminal.

Optionally, in some embodiments of the present disclosure, the target MAC identifier being not consistent with the MAC identifier of the first terminal may mean that the target MAC identifier does not include the MAC identifier of the first terminal, or that the target MAC identifier is different from the MAC identifier of the first terminal.

Optionally, in some embodiments, the target physical layer identifier being consistent with the physical layer identifier of the first terminal may also be referred to as a match between the target physical layer identifier and the physical layer identifier of the first terminal. The target physical layer identifier being not consistent with the physical layer identifier of the first terminal may also be referred to as a mismatch between the target physical layer identifier and the physical layer identifier of the first terminal.

Similarly, the target MAC layer identifier being consistent with the MAC layer identifier of the first terminal may also be referred to as a match between the target MAC layer identifier and the MAC layer identifier of the first terminal. The target MAC layer identifier being not consistent with the MAC layer identifier of the first terminal may also be referred to as a mismatch between the target MAC layer identifier and the MAC layer identifier of the first terminal.

Optionally, in some embodiments, the first terminal may also give feedback to the second terminal according to the decoding result of the first message. For example, ACK or NACK is fed back; or, NACK is fed back only in the case of decoding failure, and no feedback is given in the case of successful decoding. That is, an ACK/NACK mode may be used for feedback, or a NACK only mode may be used for feedback.

Optionally, in some embodiments, the first terminal may only perform feedback for the first message in a case where the HARQ process corresponding to the first message is enabled, and no feedback is performed in a case where the HARQ process corresponding to the first message is disabled.

Optionally, in some embodiments, if the decoding result of the first message is a decoding failure, the first terminal may wait for retransmission of the first message. For example, in a case where NACK is fed back, the first terminal waits for retransmission from the second terminal.

Optionally, in some embodiments, the waiting for retransmission of the first message corresponds to a sidelink between the first terminal and the second terminal. That is, the waiting for retransmission of a message may be per sidelink.

Optionally, in some other embodiments, the waiting for retransmission of the first message corresponds to a HARQ process used for transmitting the first message. That is, the waiting for retransmission of a message may be per HARQ process.

Optionally, in some embodiments, the first terminal waits for the retransmission of the first message while a second timer is running. The second timer is started after a third timer expires. The third timer is started after NACK is fed back for the first message.

Optionally, the duration of the second timer may be determined according to a transmission delay from the second terminal to the first terminal and a processing delay of the first message by the first terminal.

Optionally, in some embodiments, the processing delay of the first message by the first terminal is determined according to a processing delay of the first message at the physical layer of the first terminal and a processing delay of the first message at the MAC layer of the first terminal.

Optionally, in some other embodiments, the processing delay of the first message by the first terminal is determined according to the processing delay of the first message at the physical layer of the first terminal.

Optionally, the processing delay of the first message at the physical layer of the first terminal may include a delay for the first terminal to decode the SCI in the first message, or may include a delay for the first terminal to decode the SCI in the first message and a delay for the first terminal to decode the data part (payload) in the first message.

Optionally, the processing delay of the first message at the MAC layer of the first terminal may include a delay for the first terminal to process MAC PDU in the first message.

Optionally, the second terminal considers that the first terminal is in a state in which data can be received during running of the third timer, and may send a message to the first terminal.

Optionally, in some embodiments, the second terminal may determine whether to retransmit the first message according to feedback information for the first message. For example, if the first terminal feeds NACK back, the second terminal retransmits the first message. For another example, if the first terminal feeds ACK back, the second terminal sends a new transmission message.

Optionally, in some embodiments, the second terminal starts a fourth timer when a first condition is met, and during running of the fourth timer, the second terminal performs the retransmission of the first message or sending a second message.

Optionally, in some embodiments, the first condition includes at least one of the following that:
  a fifth timer expires, wherein the fifth timer is started after sending the first message;
  after a first duration after sending the first message;
  feedback information for the first message sent by the first terminal is received.

Optionally, during the running of the fourth timer, the second terminal considers that the first terminal can receive data.

For example, the second terminal may start a fifth timer after sending the first message, and start the fourth timer after the fifth timer expires, and sends a message to the first terminal during running of the fourth timer, for example, retransmitting the first message, or sending a new transmission message.

Optionally, during the running of the fifth timer, the second terminal considers that the first terminal is in a state that the first terminal cannot receive data.

Optionally, the duration of the fifth timer includes a transmission delay from the second terminal to the first terminal and a processing delay of the first message by the first terminal. For the manner of determining the processing delay of the first message by the first terminal here, reference may be made to the related descriptions in the foregoing embodiments, and for the sake of brevity, details are not repeated here.

For another example, the second terminal may wait for a first duration after sending the first message, and after the first duration, the second terminal starts the fourth timer. The second terminal may send data to the first terminal during running of the fourth timer, for example, retransmitting the first message, or sending a new transmission message.

Optionally, in the first duration, the second terminal considers that the first terminal is in a state that the first terminal cannot receive data.

Optionally, the first duration may be predefined or pre-configured, or the first duration includes a transmission delay from the second terminal to the first terminal and a processing delay of the first message by the first terminal. For the implementation of determining the processing delay of the first message by the first terminal here, reference may be made to the related descriptions in the foregoing embodiments, and for the sake of brevity, details are not repeated here.

For another example, when the second terminal receives the feedback information for the first message sent by the first terminal, the second terminal starts the fourth timer, and the second terminal may send data to the first terminal during running of the fourth timer, for example, retransmitting the first message, or sending a new transmission message.

In some embodiments, the feedback information for the first message is feedback information for the first message provided by the first terminal using the ACK/NACK mode in a case where the HARQ process corresponding to the first message is enabled.

In some embodiments, the link connection between the second terminal and the first terminal may include tow situations, i.e., a unicast link or a groupcast link. With reference to the above two link connection types, possible situations when the second terminal receives the feedback information for the first message sent by the first terminal are described below:

In some cases, there is a unicast link between the second terminal and the first terminal, and in a condition that the DRX operation is performed based on the L2 ID in the SCI information and HARQ is enabled: the feedback information for the first message received by the second terminal from the first terminal may be feedback information for the first message, sent from the first terminal to the second terminal, indicating that the first message is correctly received (e.g., ACK).

In some other cases, there is a groupcast link between the second terminal and the first terminal, and in a condition that the DRX operation is performed based on the L1 ID in the SCI information and HARQ process corresponding to the first message is enabled and an ACK/NACK mode is used: since the first terminal starts a corresponding timer after decoding the L1 ID in the SCI information, the feedback information for the first message sent by the first terminal to the second terminal may include feedback information (ACK), sent from all first terminals to the second terminal, indicating that the first message is correctly received; in this case, the second terminal starts the fourth timer (that is, ensure that all members in the group has received the first message, no matter whether the it is successfully decoded or not), and/or, the second terminal receives feedback information (NACK), sent from at least one first terminal, indicating that the first message is not correctly received.

In still other cases, there is a groupcast link between the second terminal and the first terminal, and in a condition that the DRX operation is performed based on the complete L2 ID, and the HARQ process corresponding to the first message is enabled and the ACK/NACK mode is used: since the first terminal starts a corresponding timer after decoding the L2 ID in the MAC header, the feedback information for the first message sent from the first terminal to the second terminal may include feedback information, sent from all first terminals to the second terminal, indicating that the first message is correctly received; the second terminal starts the fourth timer (to ensure that all members in the group has correctly received and decoded the first message) only in this case.

In some other cases, there is a groupcast link between the second terminal and the first terminal, the feedback information for the first message received by the second terminal from the first terminal may include: feedback information (ACK), sent from all first terminals to the second terminal, indicating that the first message is correctly received, when the HARQ process corresponding to the first message is enabled and the ACK/NACK mode is used.

Optionally, if no feedback information from the first terminal is received, the second terminal considers that the first terminal is in a state that the first terminal cannot receive data.

Optionally, in some embodiments, the first terminal starts the first timer when a second condition is met.

Optionally, in some embodiments, the second condition includes at least one of the following that:

a sixth timer expires, wherein the sixth timer is started after receiving the first message;

the sixth timer expires, wherein the sixth timer is started after a first channel resource;

the sixth timer expires, wherein the sixth timer is started after a second channel resource;

after a second duration after receiving the first message;

a third duration after the first terminal sends the feedback information for the first message;

when the first terminal sends the feedback information for the first message. For example, the first terminal may start the first timer when sending the feedback information for the first message.

In some embodiments, the first channel resource may be a PSSCH resource or a PSCCH resource for sending the first message.

In some embodiments, the second channel resource may be a feedback resource corresponding to the first message, such as a PSFCH resource.

In some embodiments, whether the sixth timer is started after the first channel resource or after the second channel resource may be configured by the network device.

For example, the network device may configure whether the sixth timer is started after the first channel resource or after the second channel resource through first configuration information.

Optionally, the first configuration information may be 1-bit indication information, and the value of the 1-bit indication information is used to indicate whether the sixth timer is started after the first channel resource or after the second channel resource.

As an example, a value of 1 for the 1-bit indication information indicates that the sixth timer is started after the first channel resource, and a value of 0 indicates that the sixth timer is started after the second channel resource.

For example, the first configuration information may be DRX_timer_after_PSCCH/PSFCH, and the value of DRX_timer_after_PSCCH/PSFCH may be 1 or T RUE, or 0 or FALSE. Different values of DRX_timer_after_PSCCH/PSFCH may respectively indicate whether the sixth timer is started after the first channel resource or after the second channel resource.

Optionally, the first configuration information may also explicitly indicate whether the sixth timer is started after the first channel resource or after the second channel resource.

For example, the first configuration information may be DRX-timer_after, and the value of DRX-timer_after may be PSCCH/PSSCH, or PSFCH. Different values of DRX-timer_after respectively indicate whether the sixth timer is started after the first channel resource or the second channel resource.

In some embodiments, the first configuration information is included in a resource pool configuration. That is, the network device may simultaneously configure the start condition of the sixth timer when performing the resource pool configuration.

For example, the resource pool is configured with PSFCH and the sixth timer is started after PSFCH, or the resource pool is configured with PSFCH and the sixth timer is started after PSCCH/PSSCH.

In some embodiments, the terminal device may adopt the following transmission modes:

First mode: a transmission resource for a terminal is allocated by a base station, and the terminal sends data on the sidelink according to the resource allocated by the base station; the base station may allocate a resource for a single transmission for the terminal, or may allocate semi-static transmission resource for the terminal.

Second mode: a terminal selects a resource from a resource pool for data transmission. For example, if the terminal is located outside the coverage of a cell, the terminal autonomously selects a transmission resource from a pre-configured resource pool for sidelink transmission; or, if the terminal is located within the coverage of the cell, the terminal autonomously selects a transmission resource for sidelink transmission from a resource pool configured by the network. In some scenarios, a PSFCH resource may or may not be configured in a resource pool, and if the PSFCH resource is configured, the terminal device may use the PSFCH resource to perform feedback or may not perform feedback.

For the first mode, the network device only knows whether the PSFCH resource is configured in the resource pool, but does not know whether the terminal device uses the PSFCH resource for feedback, so the resource scheduled by the network device may be configured assuming that the terminal device performs feedback (that is, the interval between two adjacent resources is relatively large), and in this case, the sixth timer may be started after the PSFCH resource.

For the second mode, the transmission resource of the terminal device is selected autonomously, and the terminal device may know whether it has feedback. Thus, in the case of no feedback from the terminal device, even if the PSFCH resource is configured in the resource pool, the terminal device still selects a continuous resource (the interval between two adjacent resources is relatively small), and in this case, the sixth timer is started after the PSSCH/PSCCH resource.

Optionally, the duration of the sixth timer is determined according to the delay in processing the first message by the first terminal. Here, for the specific implementation of the processing delay of the first message by the first terminal, reference may be made to the relevant descriptions in the foregoing embodiments, and for the sake of brevity, details are not repeated here.

For example, the first terminal may start the sixth timer after receiving the first message. During the running of the sixth timer, it is considered that the second terminal will not send a message to the first terminal. After the sixth timer expires, correspondingly, the fourth timer of the second terminal may be started, and at this time, the first timer is started, and a message may be transmitted between the second terminal and the first terminal.

Optionally, the second duration may be predefined or preconfigured, or the second duration includes the processing delay of the first message by the first terminal. Here, for the specific implementation of the processing delay of the first message by the first terminal, reference may be made to the relevant descriptions in the foregoing embodiments, and for the sake of brevity, details are not repeated here.

For example, the first terminal may wait for a second duration after receiving the first message, and start the first timer after the second duration, and within the second duration, the first terminal considers that the second terminal will not send the first message to the first terminal; after the second duration, correspondingly, the fourth timer of the second terminal may be started. At this time, the first timer is started, and a message may be transmitted between the second terminal and the first terminal.

Optionally, the third duration is determined according to the transmission delay from the first terminal to the second terminal and the processing delay of the feedback information by the second terminal. For example, the first terminal may wait for the third duration after sending the feedback information for the first message, and start the first timer after the third duration. Within the third duration, the first terminal considers that the second terminal will not send a message to the first terminal, because the transmission of the feedback information for the first message takes a certain amount of time, and the second terminal also takes a certain amount of time to process the feedback information. After the third duration, the first timer is started, and a message may be transmitted between the second terminal and the first terminal.

Optionally, when the first terminal sends the feedback information for the first message, it starts the first timer, and enters a state of being able to receive data.

The feedback information is the feedback information for the first message provided by the first terminal in a case where the HARQ process corresponding to the first message is enabled and the ACK/NACK mode is used, and includes two situations where there is a unicast link or a groupcast link between the second terminal and the first terminal:

If there is a unicast link between the first terminal and the second terminal, in a case where the DRX operation is performed based on the L2 ID in the SCI information and the HARQ process corresponding to the first message is enabled: when the first terminal sends feedback information (ACK) indicating that the first message is correctly received, or after third duration after the first terminal sends the feedback information (ACK) indicating that the first message is correctly received, the first terminal starts the first timer.

If there is a groupcast link between the first terminal and the second terminal, in a condition where the DRX operation is performed based on L1 ID in the SCI information and the HARQ process corresponding to the first message is enabled and the ACK/NACK mode is used: when the first terminal decodes the L1 ID in the SCI information and sends the feedback information for the first message (regardless of ACK or NACK), or, after the third duration after the first terminal sends the feedback information for the first message (regardless of ACK or NACK), the first terminal starts the first timer.

If there is a groupcast link between the first terminal and the second terminal, in a condition where the DRX operation is performed based on the complete L2 ID, and the HARQ process corresponding to the first message is enabled and the ACK/NACK mode is used: when the first terminal decodes the L2 ID in the MAC header and sends the feedback information (ACK) indicating that the first message is correctly received, or, after the third duration after the first terminal sends the feedback information (ACK) indicating that the first message is correctly received, the first terminal starts the first timer.

As an embodiment, the first terminal may start the first timer when the target physical layer identifier is consistent with the physical layer identifier of the first terminal and the second condition is met.

As another embodiment, the first terminal may start the first timer when the target physical layer identifier of the first terminal is consistent with the physical layer identifier of the first terminal, the target MAC layer identifier is consistent with the MAC layer identifier of the first terminal, and the second condition is met.

It should be noted that following embodiments are described by taking examples where only if the target physical layer identifier is consistent with the physical layer identifier of the first terminal, or the target physical layer identifier is consistent with the physical layer identifier of the first terminal and the target MAC layer identifier is consistent with the MAC layer identifier of the first terminal, the first timer is started. In other embodiments, the second condition may be used in combination or other possible condition(s) may also be used as the start condition for the first timer, and embodiments of the present disclosure do not impose specific limitations on this.

The following will describe the present disclosure in conjunction with example embodiments.

First Embodiment

Optionally, in the first embodiment, S303 may include:
decoding, by the first terminal, the received first message, and obtaining the target physical layer identifier in the first message;
determining whether the target physical layer identifier is consistent with the physical layer identifier of the first terminal, if they are consistent, starting the first timer, and entering the DRX active state; if not, not starting the first timer, and the first terminal being in the DRX sleep state.

Optionally, in some embodiments, the first terminal device may process the MAC protocol data unit (PDU) in the first message to obtain the target MAC layer identifier in the MAC PDU.

Further, whether the target MAC layer identifier is consistent with the MAC layer identifier of the first terminal is determined; if not, the first timer is turned off and the terminal device enters the DRX sleep state.

Figure 4:
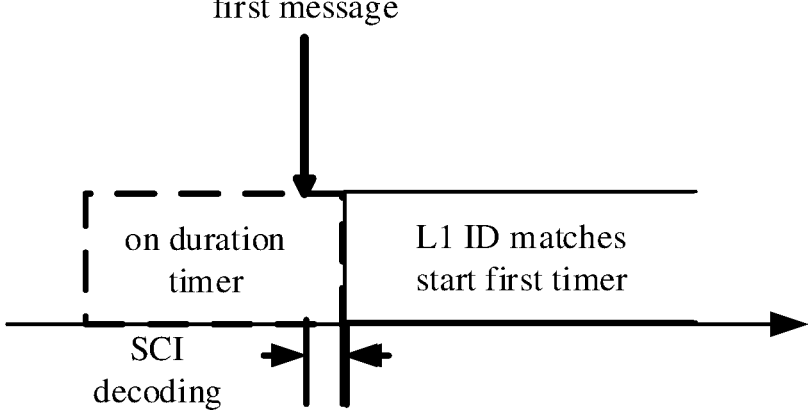
FIG. 4 to FIG. 14 are schematic diagrams of wireless communication methods according to example embodiments of the present disclosure.

FIG. 4 is a schematic diagram of an implementation of the first terminal based on first embodiment.

As shown in FIG. 4, the first terminal may perform at least part of the following operations:

In step 1, the first terminal receives a first message, where the first message includes a PSCCH and a PSSCH corresponding to the PSCCH.

In step 2, the first terminal decodes the first message, for example, decodes the first SCI in the PSCCH, and decodes the second SCI in the PSSCH, to obtain the target physical layer identifier.

Further, a corresponding operation is performed according to whether the target physical layer identifier is consistent with the physical layer identifier of the first terminal. For example, if the target physical layer identifier is consistent with the physical layer identifier of the first terminal, the first terminal starts the first timer and enters the DRX active state.

Optionally, in some embodiments, the first terminal may further process the MAC protocol data unit (PDU) in the first message to obtain the target MAC layer identifier in the MAC PDU.

Further, whether the target MAC layer identifier is consistent with the MAC layer identifier of the first terminal is determined; if not, the first terminal turns off the first timer and enters the DRX sleep state.

Figure 5:
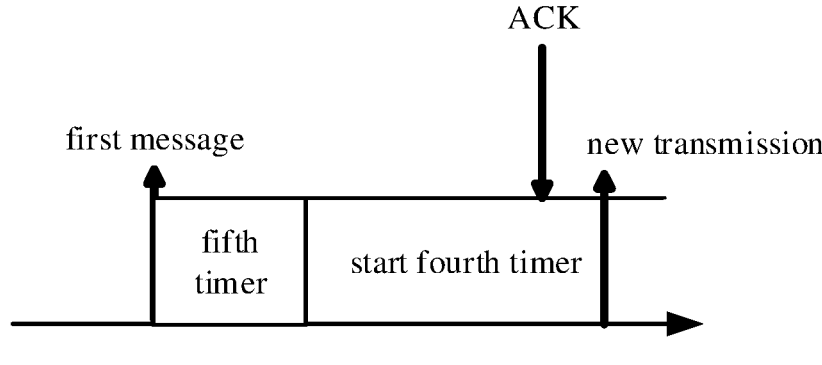

FIG. 5 is a schematic diagram of an implementation of the second terminal based on first embodiment.

In FIG. 5, the second terminal may perform the following operations:

In step 1, the second terminal sends a first message, where the first message includes a PSCCH and a PSSCH corresponding to the PSCCH.

In step 2:

As an implementation: the second terminal starts the fifth timer, and starts the fourth timer after the fifth timer expires. For the specific implementation of the fourth timer and the fifth timer, reference may be made to the relevant descriptions of the foregoing embodiments, and for the sake of brevity, details are not repeated here.

Optionally, the second terminal considers that during the running of the fourth timer, the first terminal is in a state in which the first terminal can receive data, that is, the second terminal can send a message to the first terminal.

As another implementation: the second terminal starts the fourth timer after the first duration. For a manner of determining the first duration, reference may be made to relevant descriptions in the foregoing embodiments, and details are not repeated here.

As yet another implementation: the second terminal starts the fourth timer after receiving the feedback information for the first message sent by the first terminal. The second terminal receiving the feedback information for the first message sent by the first terminal, for example, may include at least one of the following situations:

In the case of a unicast link between the first terminal and the second terminal, the second terminal receives ACK from the first terminal;

In the case of a groupcast link between the first terminal and the second terminal, the second terminal receives ACK and/or NACK from all first terminals.

Second Embodiment

Optionally, in the second embodiment, S303 may include:
if the target physical layer identifier is consistent with the physical layer identifier of the first terminal, the first terminal enters a first wake-up state and performs a DRX operation corresponding to the first wake-up state.

Optionally, the duration of the first wake-up state includes the processing time of data in the first message.

For example, the duration of the first wake-up state is determined according to the decoding time of the data in the first message and the processing time of the MAC PDU in the first message.

Optionally, in some embodiments, the first terminal is capable of buffering a received message in the first wake-up state. It should be understood that the message here may include a message sent by the second terminal, or may also include a message sent by another terminal.

As example 1: the DRX operation corresponding to the first wake-up state includes at least one of the following:

buffering a message received during the first wake-up state;

decoding data in the first message;

performing positive acknowledgement (ACK) feedback according to the decoding result of the first message;

processing the MAC protocol data unit (PDU) in the first message;

obtaining the target MAC layer identifier in the MAC PDU; and determining whether the target MAC layer identifier is consistent with the MAC layer identifier of the first terminal.

In example 1, the decoding result of the first message is a decoding success.

Further, when it is determined that the target MAC layer identifier is consistent with the MAC layer identifier of the first terminal, the first terminal starts the first timer and enter the DRX active state.

As example 2: the DRX operation corresponding to the first wake-up state includes at least one of the following:

buffering a message received during the first wake-up state;

decoding data in the first message;

performing negative acknowledgment (NACK) feedback according to the decoding result of the first message; and waiting for retransmission of the first message.

In example 2, the decoding result of the first message is a decoding failure.

The specific implementation of the first terminal and the second terminal will be described below in combination with the decoding failure and the decoding success.

Case 1: The First Message is Decoded Successfully.

Figure 6:
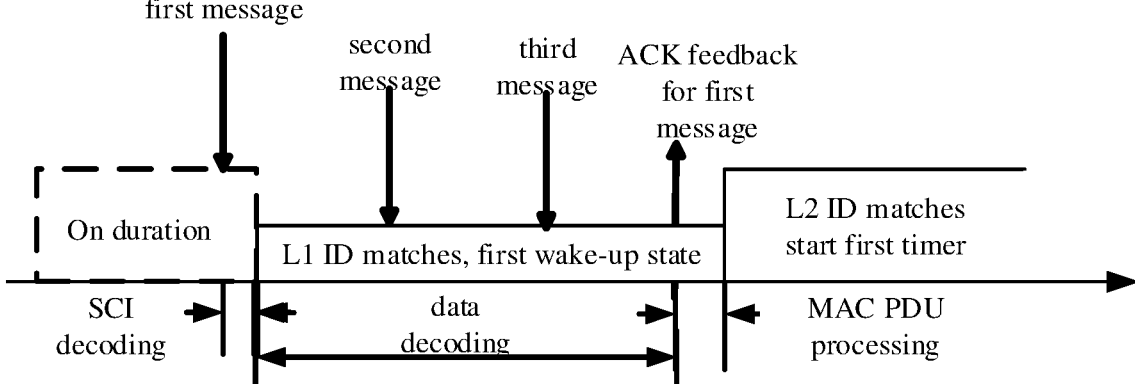

FIG. 6 is a schematic diagram of an implementation of the first terminal based on case 1 of the second embodiment.

In FIG. 6, the first terminal may perform the following operations:

In step 1, the first terminal receives a first message, where the first message includes a PSCCH and a PSSCH corresponding to the PSCCH.

In step 2, the first terminal decodes the first message, for example, decodes the first SCI in the PSCCH, and decodes the second SCI in the PSSCH, to obtain the target physical layer identifier.

Further, a corresponding operation is performed according to whether the target physical layer identifier matches the physical layer identifier of the first terminal. For example, if the target physical layer identifier is consistent with the physical layer identifier of the first terminal, the first terminal enters the first wake-up state.

Optionally, in the first wake-up state, the first terminal is may buffer data received during this period.

Optionally, the duration of the first wake-up state is the processing time of data in the first message, for example, including data decoding and MAC PDU processing time.

Optionally, in the first wake-up state, the first terminal performs at least one of the following operations:

buffering a received message, such as a message from the second terminal or a message from other terminal(s), such as a second message, a third message, etc.;

decoding data information in the first message;

performing ACK feedback for the first message according to the decoding result;

processing the MAC PDU in the first message;

obtaining the destination MAC layer address from the MAC PDU;

if the MAC layer address is consistent with the MAC layer address of the first terminal, starting the first timer and entering the DRX active state.

Optionally, in some embodiments, if the HARQ process corresponding to the first message is disabled, that is, the first terminal is configured as not needing to perform feedback, in this case, the first terminal may not perform feedback for the first message, that is, in case 1, the first terminal may not send ACK.

In step 3, the first terminal processes and/or performs feedback for the message buffered in the first wake-up state.

In case 1 of second embodiment, the second terminal may be implemented using the implementation in FIG. 5.

As shown in FIG. 5, the second terminal may perform the following operations:

In step 1, the second terminal sends a first message, where the first message includes a PSCCH and a PSSCH corresponding to the PSCCH.

In step 2:

As an implementation: the second terminal starts the fifth timer, and starts the fourth timer after the fifth timer expires. For the specific implementation of the fourth timer and the fifth timer, reference may be made to the relevant descriptions of the foregoing embodiments, and for the sake of brevity, details are not repeated here.

Optionally, the second terminal considers that during the running of the fourth timer, the first terminal is in a state in which the first terminal may receive data, that is, the second terminal may send a message to the first terminal. For example, when receiving ACK from the first terminal, the second terminal sends a new transmission message, such as sending a second message; when receiving NACK from the first terminal, the second terminal retransmits the first message.

As another implementation: the second terminal starts the fourth timer after the first duration. For a manner of determining the first duration, reference may be made to relevant descriptions in the foregoing embodiments, and details are not repeated here.

As yet another implementation: the second terminal starts the fourth timer after receiving the feedback information for the first message sent by the first terminal. The second terminal receiving the feedback information for the first message sent by the first terminal, for example, may include at least one of the following situations:

In the case of a unicast link between the first terminal and the second terminal, the second terminal receives ACK from the first terminal;

In the case of a groupcast link between the first terminal and the second terminal, the second terminal receives ACK and/or NACK from all the first terminals.

In step 3, the second terminal receives the ACK feedback information for the first message, considers that the first message has been successfully received, and may continue to send a new transmission message.

Case 2: Decoding of the First Message Fails.

Figure 7:
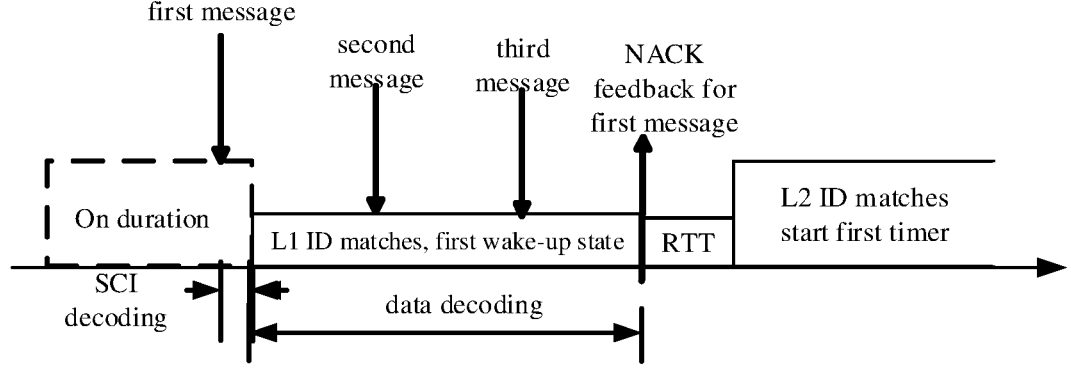

FIG. 7 is a schematic diagram of an implementation of the first terminal based on case 2 of the second embodiment.

In FIG. 7, the first terminal may perform the following operations:

In step 1, the first terminal receives a first message, where the first message includes a PSCCH and a PSSCH corresponding to the PSCCH.

In step 2, the first terminal decodes the first message, for example, decodes the first SCI in the PSCCH, and decodes the second SCI in the PSSCH, to obtain the target physical layer identifier.

Further, a corresponding operation is performed according to whether the target physical layer identifier matches the physical layer identifier of the first terminal. For example, if the target physical layer identifier is consistent with the physical layer identifier of the first terminal, the first terminal enters the first wake-up state.

Optionally, in the first wake-up state, the first terminal may buffer data received during this period.

Optionally, the duration of the first wake-up state is the processing time of data in the first message, for example, including data decoding and MAC PDU processing time.

Optionally, in the first wake-up state, the first terminal performs at least one of the following operations:

buffering a received message, such as a message from the second terminal or a message from other terminal(s), such as a second message, a third message, etc.;

decoding data information in the first message;

performing NACK feedback for the first message according to the decoding result;

wait for retransmission of the first message.

Optionally, in some embodiments, the waiting for retransmission of the first message corresponds to a sidelink between the first terminal and the second terminal. That is, the waiting for retransmission of the message may be per sidelink. That is, the sidelink corresponding to the first message is in the state of waiting for retransmission, and other sidelink(s) is(are) in the first wake-up state, and the first terminal may buffer a message transmitted on other link(s).

Optionally, in some other embodiments, the waiting for retransmission of the first message corresponds to a Hybrid Automatic Repeat reQuest (HARQ) process used for transmitting the first message. That is, the waiting for retransmission of the message may be per HARQ process.

Optionally, in some embodiments, the first terminal waits for the retransmission of the first message while the second timer is running. The second timer is started after the third timer expires, and the third timer is started after NACK is fed back for the first message.

Optionally, in some embodiments, if the HARQ process corresponding to the first message is disabled, that is, the first terminal is configured as not needing to perform feedback, in this case, the first terminal may not perform feedback for the first message, that is, in case 2, the first terminal may not send NACK.

In step 3, the first terminal processes and/or performs feedback for a message buffered in the first wake-up state.

Figure 8:
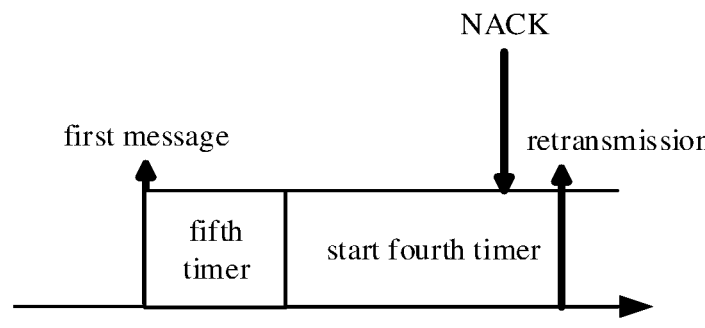

FIG. 8 is a schematic diagram of an implementation of the second terminal based on case 2 of the second embodiment.

In FIG. 8, the second terminal may perform the following operations:

In step 1, the second terminal sends a first message, where the first message includes a PSCCH and a PSSCH corresponding to the PSCCH.

In step 2, the second terminal starts the second timer, and starts the third timer after the second timer expires.

For the specific implementation of the second timer and the third timer, reference may be made to the description of the foregoing embodiments, and for the sake of brevity, details are not repeated here.

In step 3, UE2 receives the NACK feedback information for the first message, considers that the first message has not been successfully received and a retransmission message is needed (HARQ enable).

Third Embodiment

Optionally, in the third embodiment, S303 may include:

if the target physical layer identifier is consistent with the physical layer identifier of the first terminal, the first terminal enters a second wake-up state and performs a DRX operation corresponding to the second wake-up state.

Optionally, the duration of the second wake-up state includes the processing time of data in the first message.

For example, the duration of the second wake-up state is determined according to the decoding time of the data in the first message and the processing time of the MAC PDU in the first message.

Optionally, in some embodiments, the first terminal is capable of decoding a received message in the second wake-up state. It should be understood that the message here may include a message sent by the second terminal, or may also include a message sent by another terminal.

As example 1: the DRX operation corresponding to the second wake-up state includes at least one of the following:

decoding a message received during the second wake-up state;

decoding data in the first message;

performing positive acknowledgement (ACK) feedback according to the decoding result of the first message;

processing the MAC protocol data unit (PDU) in the first message;

obtaining the target MAC layer identifier in the MAC PDU; and determining whether the target MAC layer identifier is consistent with the MAC layer identifier of the first terminal.

In example 1, the decoding result of the first message is a decoding success.

Further, when it is determined that the target MAC layer identifier is consistent with the MAC layer identifier of the first terminal, the first terminal starts the first timer and enter the DRX active state.

As example 2: the DRX operation corresponding to the second wake-up state includes at least one of the following:

decoding a message received during the second wake-up state;

decoding data in the first message;

performing negative acknowledgment (NACK) feedback according to the decoding result of the first message; and waiting for retransmission of the first message.

In example 2, the decoding result of the first message is a decoding failure.

The specific implementation of the first terminal and the second terminal will be described below in combination with the decoding failure and the decoding success.

Case 1: The First Message is Decoded Successfully.

Figure 9:
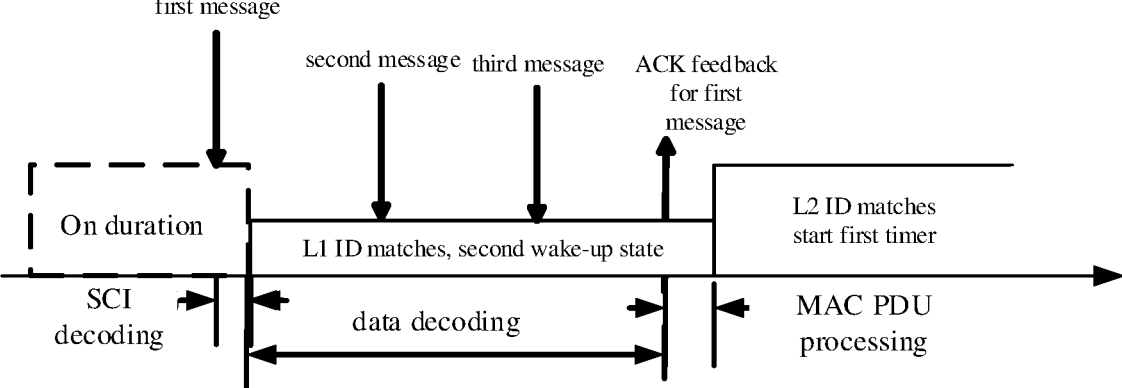

FIG. 9 is a schematic diagram of an implementation of the first terminal based on case 1 of the third embodiment.

As shown in FIG. 9, the first terminal may perform the following operations:

In step 1, the first terminal receives a first message, where the first message includes a PSCCH and a PSSCH corresponding to the PSCCH.

In step 2, the first terminal decodes the first message, for example, decodes the first SCI in the PSCCH, and decodes the second SCI in the PSSCH, to obtain the target physical layer identifier.

Further, a corresponding operation is performed according to whether the target physical layer identifier matches the physical layer identifier of the first terminal. For example, if the target physical layer identifier is consistent with the physical layer identifier of the first terminal, the first terminal enters the second wake-up state.

Optionally, in the second wake-up state, the first terminal may decode data received during this period.

Optionally, the duration of the second wake-up state is the processing time of data in the first message, for example, including data decoding and MAC PDU processing time.

Optionally, in the second wake-up state, the first terminal performs at least one of the following operations:

decoding a received message, such as a message from the second terminal or a message from other terminal(s), such as a second message, a third message, etc.;

decoding the data information in the first message;

performing ACK feedback for the first message according to the decoding result;

processing the MAC PDU in the first message;

obtaining the destination MAC layer address from the MAC PDU; and if the MAC layer address is consistent with the MAC layer address of the first terminal, starting the first timer and entering the DRX active state.

Optionally, in some embodiments, if the HARQ process corresponding to the first message is disabled, that is, the first terminal is configured as not needing to perform feedback, in this case, the first terminal may not perform feedback for the first message, that is, in case 1, the first terminal may not send ACK.

In case 1 of third embodiment, the implementation of the second terminal is similar to the behavior of the second terminal in case 1 of second embodiment. For specific implementation, reference may be made to the relevant description of second embodiment. For brevity, details are not repeated here.

Case 2: Decoding of the First Message Fails.

Figure 10:
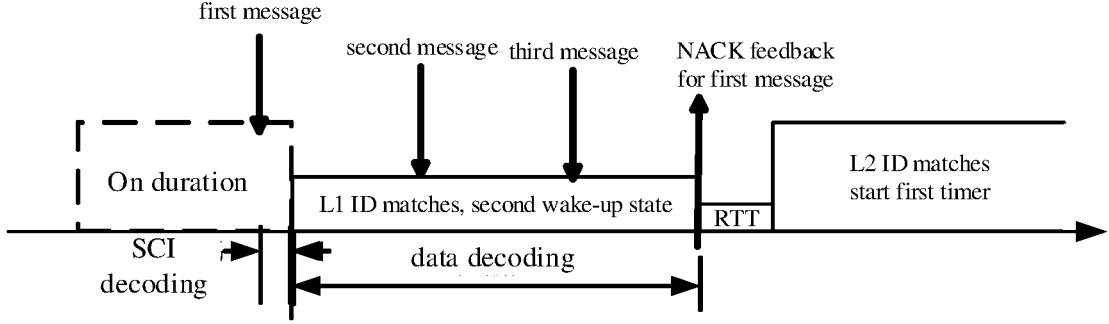

FIG. 10 is a schematic diagram of an implementation of the first terminal based on case 2 of the third embodiment.

As shown in FIG. 10, the first terminal may perform the following operations:

In step 1, the first terminal receives a first message, where the first message includes a PSCCH and a PSSCH corresponding to the PSCCH.

In step 2, the first terminal decodes the first message, for example, decodes the first SCI in the PSCCH, and decodes the second SCI in the PSSCH, to obtain the target physical layer identifier.

Further, a corresponding operation is performed according to whether the target physical layer identifier matches the physical layer identifier of the first terminal. For example, if the target physical layer identifier is consistent with the physical layer identifier of the first terminal, the first terminal enters the second wake-up state.

Optionally, in the second wake-up state, the first terminal may decode data received during this period.

Optionally, the duration of the second wake-up state is the processing time of data in the first message, for example, including data decoding and MAC PDU processing time.

Optionally, in the second wake-up state, the first terminal performs at least one of the following operations:

decoding a received message, such as a message from the second terminal or a message from other terminal(s), such as a second message, a third message, etc.;

decoding the data information in the first message;

performing NACK feedback for the first message according to the decoding result; and wait for the retransmission of the first message.

Optionally, in some embodiments, the waiting for retransmission of the first message corresponds to a sidelink between the first terminal and the second terminal. That is, the waiting for retransmission of the message may be per sidelink. That is, the sidelink corresponding to the first message is in the state of waiting for retransmission, and other sidelink(s) is(are) in the first wake-up state, and the first terminal may buffer a message transmitted on other link(s).

Optionally, in some other embodiments, the waiting for retransmission of the first message corresponds to a Hybrid Automatic Repeat reQuest (HARQ) process used for transmitting the first message. That is, the waiting for retransmission of the message may be per HARQ process.

Optionally, in some embodiments, the first terminal waits for the retransmission of the first message while the second timer is running. The second timer is started after the third timer expires, and the third timer is started after NACK is fed back for the first message.

Optionally, in some embodiments, if the HARQ process corresponding to the first message is disabled, that is, the first terminal is configured as not needing to perform feedback, in this case, the first terminal may not perform feedback for the first message, that is, in case 2, the first terminal may not send NACK.

In case 2 of third embodiment, the implementation of the second terminal is similar to the behavior of the second terminal in case 2 of second embodiment. For specific implementation, reference may be made to the relevant description of second embodiment. For brevity, details are not repeated here.

Optionally, in the foregoing embodiments, the first message may be received during the running of the DRX on duration timer, or may be received after the DRX on duration timer expires.

Fourth Embodiment

Optionally, in some embodiments, the first terminal may perform the following operations after receiving the first message:

decoding data in the first message; and performing ACK feedback or NACK feedback according to the decoding result of the first message.

Optionally, if the first terminal enters the sleep state, the first terminal does not perform data reception.

Optionally, in the fourth embodiment, the first message may be received during the running of the DRX on duration timer, and after the DRX on duration timer expires, the first terminal enters the DRX sleep state, and does not perform data reception.

In the fourth embodiment, the second terminal may receive feedback information for the first message sent by the first terminal, and retransmit the first message or send a new transmission message according to the feedback information.

The specific implementations of the first terminal and the second terminal will be described below in combination with the decoding failure and the decoding success.

Case 1: The First Message is Decoded Successfully.

Figure 11:
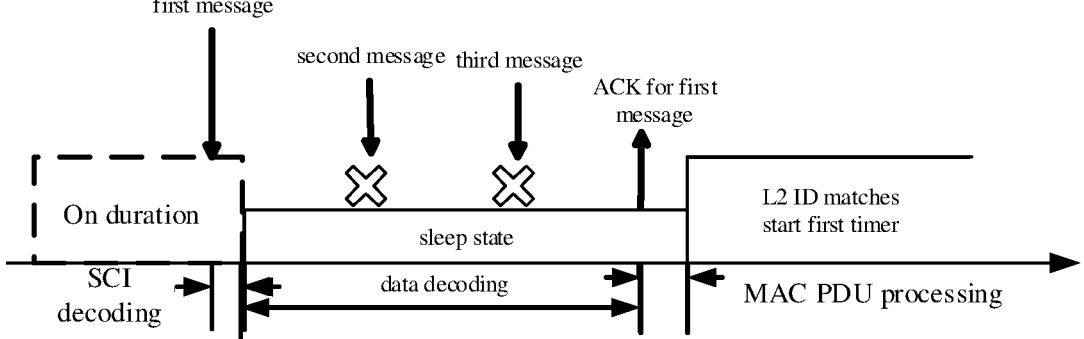

FIG. 11 is a schematic diagram of an implementation of the first terminal based on case 1 of the fourth embodiment.

As shown in FIG. 11, the first terminal may perform the following operations:

In step 1, the first terminal receives a first message, where the first message includes a PSCCH and a PSSCH corresponding to the PSCCH.

In step 2, the first terminal decodes the first message, for example, decodes the first SCI in the PSCCH, and decodes the second SCI in the PSSCH;

performs ACK feedback for the first message according to the decoding result;

processes the MAC PDU in the first message to obtain the MAC layer address.

It is further determined whether the target MAC layer identifier is consistent with the MAC layer identifier of the first terminal, and if yes, the first terminal starts the first timer and enters the DRX active state.

Figure 12:

FIG. 12 is a schematic diagram of an implementation of the second terminal based on case 1 of the fourth embodiment.

As shown in FIG. 12, the second terminal may perform the following operations:

In step 1, the second terminal sends a first message, where the first message includes a PSCCH and a PSSCH corresponding to the PSCCH.

In step 2, the second terminal receives the ACK feedback information for the first message, starts the fourth timer, and considers that the first message is successfully received and the second terminal may continue to send a new transmission message. The second terminal receiving the feedback information for the first message sent by the first terminal, for example, may include at least one of the following situations:

In the case of a unicast link between the first terminal and the second terminal, the second terminal receives ACK from the first terminal;

In the case of a groupcast link between the first terminal and the second terminal, the second terminal receives ACK and/or NACK from all first terminals.

FIG. 12 may correspond to the situation where the HARQ process is enabled, that is, the first terminal needs to perform feedback.

Optionally, in some other embodiments, the second terminal may be implemented in the manner shown in the embodiment shown in FIG. 5, which will not be repeated here for brevity.

Case 2: Decoding of the First Message Fails.

Figure 13:
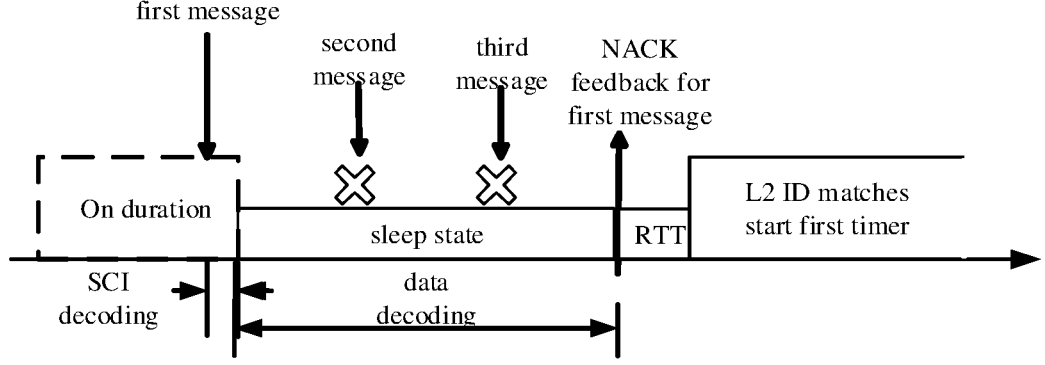

FIG. 13 is a schematic diagram of an implementation of the first terminal based on case 2 of the fourth embodiment.

As shown in FIG. 13, the first terminal may perform the following operations:

In step 1, the first terminal receives a first message, where the first message includes a PSCCH and a PSSCH corresponding to the PSCCH.

In step 2, the first terminal decodes the first message, for example, decodes the first SCI in the PSCCH, and decodes the second SCI in the PSSCH;

performs NACK feedback for the first message according to the decoding result;

waits for retransmission of the first message.

For the specific implementation of waiting for retransmission of the first message, reference may be made to the relevant description of the foregoing embodiments, and for the sake of brevity, details are not repeated here.

Figure 14:
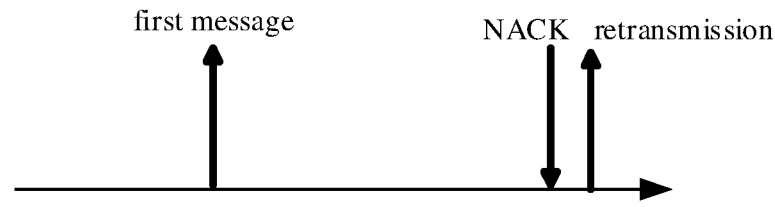
Figure 15:
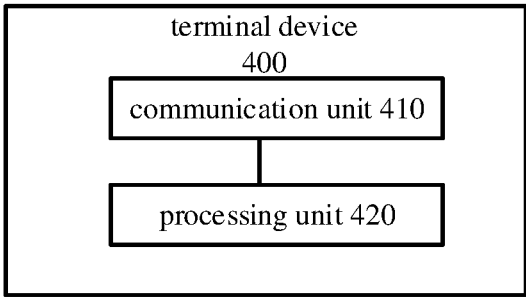
FIG. 15 is a schematic block diagram of a terminal device according to an embodiment of the present disclosure.

FIG. 14 is a schematic diagram of an implementation of the second terminal based on case 2 of the fourth embodiment.

As shown in FIG. 14, the second terminal may perform the following operations:

In step 1, the second terminal sends a first message, where the first message includes a PSCCH and a PSSCH corresponding to the PSCCH.

In step 2, UE2 receives NACK feedback information for the first message, and considers that the first message has not been successfully received and the receiver UE needs to send a retransmission message.

Optionally, in some other embodiments, the second terminal may be implemented in the manner shown in the embodiment shown in FIG. 5, which will not be repeated here for brevity.

Therefore, in the embodiments of the present disclosure, the first terminal can perform a DRX operation according to the physical layer identifier and/or the MAC layer identifier in the received message, which is beneficial to realize the purpose of terminal power saving in the sidelink.

The method embodiments of the present disclosure are described in detail above in conjunction with FIG. 3 to FIG. 14, and the device embodiments of the present disclosure will be described in detail below in conjunction with FIG. 15 to FIG. 18. It should be understood that the device embodiments and the method embodiments correspond to each other, reference may be made to similar descriptions regarding the method embodiments.

FIG. 4 is a schematic block diagram of a terminal device 400 according to an embodiment of the present disclosure. As shown in FIG. 4, the terminal device 400 includes a communication unit 410 and a processing unit 420.

The communication unit 410 is configured to receive a first message sent by a second terminal.

The processing unit 420 is configured to obtain a target physical identifier and/or a target Media Access Control (MAC) layer identifier in the first message; and perform a Discontinuous Reception (DRX) operation according to the target physical layer identifier and/or the target MAC layer identifier.

Optionally, in some embodiments, the processing unit 420 is further configured to:

in response to that the target physical layer identifier is consistent with a physical layer identifier of the terminal device, start, by the terminal device, a first timer, wherein the terminal device is in a DRX active state during running of the first timer.

Optionally, in some embodiments, the processing unit 420 is further configured to:

in response to that the target MAC layer identifier is not consistent with a MAC layer identifier of the terminal device, turn off, by the terminal device, the first timer, and the terminal device being in a DRX sleep state.

Optionally, in some embodiments, the processing unit 420 is further configured to:

in response to that the target physical layer identifier is consistent with a physical layer identifier of the terminal device and the target MAC layer identifier is consistent with a MAC layer identifier of the terminal device, start, by the terminal device, a first timer, wherein the terminal device is in a DRX active state during running of the first timer.

Optionally, in some embodiments, the processing unit 420 is further configured to:

in response to that the target physical layer identifier is consistent with the physical layer identifier of the terminal device, enter, by the terminal device, a first wake-up state and perform a DRX operation corresponding to the first wake-up state.

Optionally, in some embodiments, a duration of the first wake-up state includes a processing time of data in the first message.

Optionally, in some embodiments, in the first wake-up state, the terminal device is capable of buffering a received message.

Optionally, in some embodiments, the DRX operation corresponding to the first wake-up state includes at least one of the following:

buffering a message received during the first wake-up state;
decoding data in the first message;
performing positive acknowledgement (ACK) feedback according to a decoding result of the first message;
processing MAC Protocol Data Unit (PDU) in the first message;
obtaining the target MAC layer identifier in the MAC PDU; and
determining whether the target MAC layer identifier is consistent with the MAC layer identifier of the terminal device.

Optionally, in some embodiments, the DRX operation corresponding to the first wake-up state includes at least one of the following:

buffering a message received during the first wake-up state;
decoding data in the first message;
performing negative acknowledgment (NACK) feedback according to a decoding result of the first message; and
waiting for retransmission of the first message.

Optionally, in some embodiments, the waiting for retransmission of the first message corresponds to a sidelink between the terminal device and the second terminal; or
the waiting for retransmission of the first message corresponds to a Hybrid Automatic Repeat reQuest (HARQ) process used for transmitting the first message.

Optionally, in some embodiments, the processing unit 420 is further configured to:

after entering the DRX active state, process a buffered message and/or perform a feedback on the buffered message.

Optionally, in some embodiments, the processing unit 420 is further configured to:

in response to that the target physical layer identifier is consistent with a physical layer identifier of the terminal device, enter, by the terminal device, a second wake-up state and perform a DRX operation corresponding to the second wake-up state.

Optionally, in some embodiments, a duration of the second wake-up state includes a processing time of data in the first message.

Optionally, in some embodiments, the terminal device is capable of decoding a received message in the second wake-up state.

Optionally, in some embodiments, the DRX operation corresponding to the second wake-up state includes at least one of the following:

decoding a message received during the second wake-up state;
decoding data in the first message;
performing ACK feedback according to a decoding result of the first message;
processing MAC PDU in the first message;

obtaining the target MAC layer identifier in the MAC PDU; and
determining whether the target MAC layer identifier is consistent with the MAC layer identifier of the terminal device.

Optionally, in some embodiments, the DRX operation corresponding to the second wake-up state includes at least one of the following:

decoding a message received during the second wake-up state;
decoding data in the first message;
performing NACK feedback according to a decoding result of the first message; and
waiting for retransmission of the first message.

Optionally, in some embodiments, the waiting for retransmission of the first message corresponds to a sidelink between the terminal device and the second terminal; or
the waiting for retransmission of the first message corresponds to a HARQ process used for transmitting the first message.

Optionally, in some embodiments, the processing unit 420 is further configured to perform at least one of the following:

after entering a sleep state, not performing data reception;
decoding data in the first message;
performing ACK feedback according to a decoding result of the first message;
processing MAC PDU in the first message;
obtaining the target MAC layer identifier in the MAC PDU; and
determine whether the target MAC layer identifier is consistent with a MAC layer identifier of the terminal device.

Optionally, in some embodiments, the processing unit 420 is further configured to perform at least one of the following:

after entering a sleep state, not performing data reception;
decoding data in the first message;
performing NACK feedback according to a decoding result of the first message; and
waiting for retransmission of the first message.

Optionally, in some embodiments, the waiting for retransmission of the first message corresponds to a sidelink between the terminal device and the second terminal; or
the waiting for retransmission of the first message corresponds to a HARQ process used for transmitting the first message.

Optionally, in some embodiments, the processing unit 420 is further configured to:

wait for retransmission of the first message during running of a second timer, wherein the second timer is started after a third timer expires, and the third timer is started after a feedback is performed for the first message.

Optionally, in some embodiments, the processing unit 420 is further configured to:

start, by the terminal device, a first timer when a second condition is met, wherein the second condition includes at least one of the following that:

a sixth timer expires, wherein the sixth timer is started after receiving the first message;
the sixth timer expires, wherein the sixth timer is started after a first channel resource, and the first channel resource is a Physical Sidelink Shared Channel (PSSCH) resource or a Physical Sidelink Control Channel (PSCCH) resource for sending the first message;
the sixth timer expires, wherein the sixth timer is started after a second channel resource, and the second channel resource is a Physical Sidelink Feedback Channel (PSFCH) resource corresponding to the first message;

after a second duration after the first message is received;

a third duration after the terminal device sends feedback information for the first message; and when the terminal device sends the feedback information for the first message.

In some embodiments, the sixth timer being started after the first channel resource or after the second channel resource is configured by a network device.

In some embodiments, the sixth timer being started after the first channel resource or after the second channel resource is configured by the network device through first configuration information, and the first configuration information is included in a resource pool configuration.

Optionally, in some embodiments, the feedback information for the first message includes at least one of the following situations that:

the first terminal and the second terminal are in a unicast link, and when a HARQ process corresponding to the first message is enabled, the feedback information for the first message is feedback information indicating that the first message is correctly received;

the first terminal and the second terminal are in a group-cast link, and when a HARQ process corresponding to the first message is enabled and an ACK/NACK mode is used, the feedback information for the first message is feedback information indicating that the first message is correctly received; and the first terminal and the second terminal are in a group-cast link, and when a HARQ process corresponding to the first message is enabled and an ACK/NACK mode is used, the feedback information for the first message includes feedback information indicating that the first message is correctly received and/or feedback information indicating that the first message is not correctly received.

Optionally, in some embodiments, the above-mentioned communication unit may be a communication interface or a transceiver, or an input-output interface of a communication chip or a system-on-chip. The aforementioned processing unit may be one or more processors.

It should be understood that the terminal device 400 according to the embodiments of the present disclosure may correspond to the terminal device in the method embodiments of the present disclosure, and the above-mentioned and other operations and/or functions of each unit in the terminal device 400 are used to realize the corresponding processes of the first terminal in the method 300 shown in FIG. 3 to FIG. 14, and for the sake of brevity, detailed descriptions are not repeated here.

Figure 16:
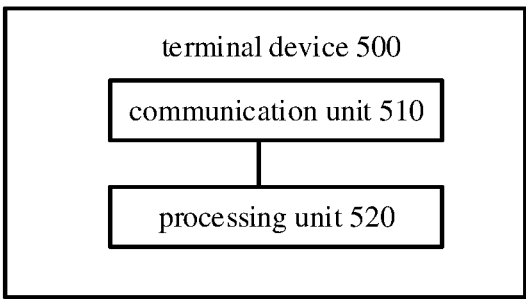
FIG. 16 is a schematic block diagram of a terminal device according to an embodiment of the present disclosure.

FIG. 16 is a schematic block diagram of a terminal device according to an embodiment of the present disclosure. The terminal device 500 in FIG. 16 includes a communication unit 510 and a processing unit 520.

The communication unit 510 is configured to send a first message to a first terminal.

The processing unit 520 is configured to start a fourth timer in a case where a first condition is met.

The communication unit is further configured to, during running of the fourth timer, retransmit, by the terminal device, the first message or sending a second message.

Optionally, in some embodiments, the first condition includes at least one of the following that:

a fifth timer expires, wherein the fifth timer is started after sending the first message;

after a first duration after sending the first message; and feedback information for the first message sent by the first terminal is received.

Optionally, in some embodiments, the feedback information for the first message includes at least one of the following situations that:

the first terminal and the second terminal are in a unicast link, and when a HARQ process corresponding to the first message is enabled, the feedback information for the first message is feedback information indicating that the first message is correctly received;

the first terminal and the second terminal are in a group-cast link, and when a HARQ process corresponding to the first message is enabled and an ACK/NACK mode is used, the feedback information for the first message is feedback information indicating that the first message is correctly received; and the first terminal and the second terminal are in a group-cast link, and when a HARQ process corresponding to the first message is enabled and an ACK/NACK mode is used, the feedback information for the first message includes feedback information indicating that the first message is correctly received and/or feedback information indicating that the first message is not correctly received.

Optionally, in some embodiments, a duration of the fifth timer includes a transmission delay from the terminal device to the first terminal and a processing delay of the first message by the first terminal.

Optionally, in some embodiments, the communication unit 510 is further configured to:

in response to that the terminal device receives feedback information for the first message sent by the first terminal and the feedback information is a negative acknowledgment (NACK), retransmit, by the terminal device, the first message; or in response to that the terminal device receives the feedback information for the first message sent by the first terminal and the feedback information is a positive acknowledgment (ACK), send, by the terminal device, the second message.

Optionally, in some embodiments, the above-mentioned communication unit may be a communication interface or a transceiver, or an input-output interface of a communication chip or a system-on-chip. The aforementioned processing unit may be one or more processors.

It should be understood that the terminal device 500 according to the embodiments of the present disclosure may correspond to the network device in the method embodiments of the present disclosure, and the above-mentioned and other operations and/or functions of each unit in the terminal device 500 are used to realize the corresponding processes of the second terminal in the method 300 shown in FIG. 3 to FIG. 14, and for the sake of brevity, detailed descriptions are not repeated here.

Figure 17:
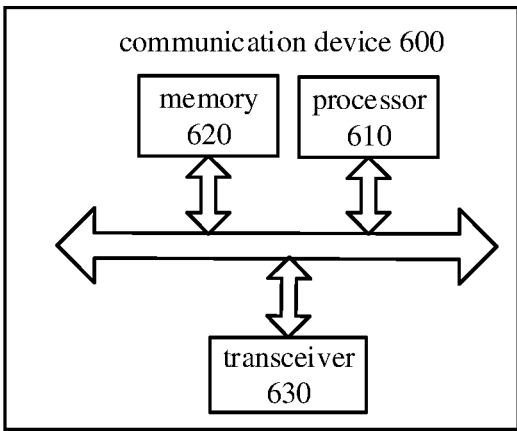
FIG. 17 is a schematic block diagram of a communication device according to an embodiment of the present disclosure.

FIG. 17 is a schematic structural diagram of a communication device 600 according to an embodiment of the present disclosure. The communication device 600 shown in FIG. 17 includes a processor 610, and the processor 610 may call and run a computer program from a memory to perform the method in embodiments of the present disclosure.

According to embodiments, as shown in FIG. 17, the communication device 600 may further include a memory 620. The processor 610 may call and run a computer program from the memory 620 to perform the method in embodiments of the present disclosure.

The memory 620 may be a separate device independent of the processor 610, or may be integrated in the processor 610.

According to embodiments, as shown in FIG. 17, the communication device 600 may further include a transceiver 630, and the processor 610 may control the transceiver 630 to communicate with other devices. Specifically, the transceiver may send information or data to other devices, or receive information or data sent by other devices.

The transceiver 630 may include a transmitter and a receiver. The transceiver 630 may further include one or more antennas.

According to embodiments, the communication device 600 may specifically be the first terminal or the second terminal according to an embodiment of the present disclosure, and the communication device 600 may implement the corresponding processes implemented by the first terminal or the second terminal in the method embodiments of the present disclosure.

Figure 18:
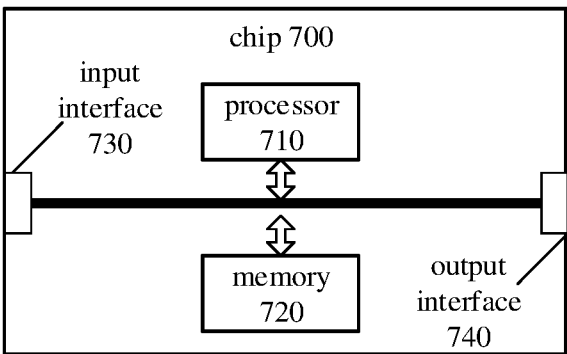
FIG. 18 is a schematic block diagram of a chip according to an embodiment of the present disclosure.

FIG. 18 is a schematic structural diagram of a chip according to an embodiment of the present disclosure. The chip 700 shown in FIG. 18 includes a processor 710, and the processor 710 can call and run a computer program from a memory to implement the method according to embodiments of the present disclosure.

According to embodiments, as shown in FIG. 18, the chip 700 may further include a memory 720. The processor 710 may call and run a computer program from the memory 720 to implement the method according to embodiments of the present disclosure.

The memory 720 may be a separate device independent of the processor 710, or may be integrated in the processor 710.

According to embodiments, the chip 700 may further include an input interface 730. The processor 710 may control the input interface 730 to communicate with other apparatus or chips, and specifically, the processor 710 can control the input interface to obtain information or data sent by other apparatus or chips.

According to embodiments, the chip 700 may further include an output interface 740. The processor 710 can control the output interface 740 to communicate with other apparatus or chips, and specifically, the processor 710 can control the output interface 740 to output information or data to other apparatus or chips.

According to embodiments, the chip may be applied to the first terminal or the second terminal in embodiments of the present disclosure, and the chip can implement the corresponding processes implemented by the first terminal or the second terminal in various methods according to embodiments of the present disclosure. For brevity, details are not repeated herein again.

It should be understood that the chip in the embodiments of the present disclosure may be referred to as a system-level chip, a system chip, a chip system, or a system-on-chip, etc.

It should be understood that the processor in embodiments of the present disclosure may be an integrated circuit chip with signal processing capability. In implementations, the steps of the foregoing method embodiments can be completed by hardware integrated logic circuits in the processor or instructions in the form of software. The above-mentioned processor may be a general-purpose processor, a Digital Signal Processor (DSP), an Application Specific Integrated Circuit (ASIC), a Field Programmable Gate Array (FPGA) or other programmable logic device, discrete gate or transistor logic device, discrete hardware component. The methods, steps, and logical block diagrams disclosed in the embodiments of the present disclosure can be implemented or executed. The general-purpose processor may be a microprocessor or the processor may also be any conventional processor or the like. The steps of the methods disclosed in the embodiments of the present disclosure may be directly embodied as being executed and completed by a hardware decoding processor, or executed by a combination of hardware and software modules in the decoding processor. The software module can be located in a storage medium in the field, such as random access memory, flash memory, read-only memory, programmable read-only memory, or electrically erasable programmable memory, register. The storage medium is located in the memory, and the processor reads the information in the memory to perform the steps of the above methods in combination with hardware.

It can be understood that the memory in the embodiments of the present disclosure may be volatile memory or non-volatile memory, or may include both volatile and non-volatile memory. The non-volatile memory can be Read-Only Memory (ROM), Programmable ROM (PROM), Erasable PROM (EPROM), Electrically EPROM (EE-PROM) or flash memory. The volatile memory may be a Random Access Memory (RAM), which is used as an external cache. By way of exemplary rather than limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SL-DRAM)), or Direct Rambus RAM (DR RAM). It should be noted that the memory in the systems and methods described in the present disclosure is intended to include but not limited to these and any other suitable types of memory.

It should be understood that the foregoing memory is exemplary but not restrictive. For example, the memory in embodiments of the present disclosure may also be Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), or Direct Rambus RAM (DR RAM), and so on. That is to say, the memory in embodiments of the present disclosure is intended to include but not limited to these and any other suitable types of memory.

An embodiment of the present disclosure also provides a computer-readable storage medium for storing computer programs.

According to embodiments, the computer-readable storage medium may be applied to the network device in embodiments of the present disclosure, and the computer programs cause a computer to perform the corresponding processes implemented by the network device in each method embodiment of the present disclosure. For brevity, repeated descriptions are omitted here.

According to embodiments, the computer-readable storage medium may be applied to the mobile terminal/terminal device in embodiments of the present disclosure, and the computer programs cause a computer to perform the corresponding processes implemented by the mobile terminal/terminal device in each method embodiment of the present disclosure. For brevity, repeated descriptions are omitted here.

An embodiment of the present disclosure provides a computer program product, including computer program instructions.

According to embodiments, the computer program product may be applied to the network device in embodiments of the present disclosure, and the computer program instructions cause a computer to perform the corresponding processes implemented by the network device in each method embodiment of the present disclosure. For brevity, repeated descriptions are omitted here.

According to embodiments, the computer program product may be applied to the mobile terminal/terminal device in embodiments of the present disclosure, and the computer program instructions cause a computer to perform the corresponding processes implemented by the mobile terminal/terminal device in each method embodiment of the present disclosure. For brevity, repeated descriptions are omitted here.

An embodiment of the present disclosure also provides a computer program.

According to embodiments, the computer program may be applied to the network device in embodiments of the present disclosure, and when the computer program runs on a computer, the computer is caused to perform the corresponding processes implemented by the network device in each method embodiment of the present disclosure. For brevity, repeated descriptions are omitted here.

According to embodiments, the computer program may be applied to the mobile terminal/terminal device in embodiments of the present disclosure, and when the computer program runs on a computer, the computer is caused to perform the corresponding processes implemented by the mobile terminal/terminal device in each method embodiment of the present disclosure. For brevity, repeated descriptions are omitted here.

Those of ordinary skill in the art will appreciate that the exemplary units and algorithm steps described according to embodiments disclosed herein can be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

It may be clearly understood by those skilled in the art that details of specific operation procedures of the systems, devices and units can be found in the previous description regarding the method embodiments.

In the embodiments provided in the present disclosure, it should be understood that the disclosed systems, devices and methods may be implemented in other ways. For example, the device embodiments described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the embodiments.

In addition, the functional units in the embodiments of the present disclosure may be integrated in one processing unit, or the units may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in a storage medium including a number of instructions such that a computer device (which may be a personal computer, a server, or a network device, etc.) performs all or part of steps of the method described in each of the embodiments of the present disclosure. The foregoing storage medium includes: any medium that is capable of storing program codes such as a USB disk, a mobile hard disk, a Read-Only Memory (ROM), a Random Access Memory (RAM), a magnetic disk or an optical disk, and the like.

The foregoing descriptions are merely exemplary embodiments of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defined by the appended claims.

What is claimed is:

1. A wireless communication method, comprising:
receiving, by a first terminal, a first message sent by a second terminal;
decoding, by the first terminal, Sidelink Control Information (SCI) in the first message to obtain a target physical layer identifier in the first message, wherein the target physical layer identifier is a layer 1 identifier; and
performing a Discontinuous Reception (DRX) operation according to the target physical layer identifier;
wherein performing the DRX operation according to the target physical layer identifier comprises:
in response to that the target physical layer identifier is consistent with a physical layer identifier of the first terminal, starting, by the first terminal, a first timer, wherein the first terminal is in a DRX active state during running of the first timer.

2. The method according to claim 1, further comprising at least one of the following:
after entering a sleep state, not performing data reception;
decoding data in the first message;
performing NACK feedback according to a decoding result of the first message; or
waiting for retransmission of the first message.

3. The method according to claim 2, wherein the waiting for retransmission of the first message corresponds to a sidelink between the first terminal and the second terminal; or
wherein the waiting for retransmission of the first message corresponds to a Hybrid Automatic Repeat reQuest (HARQ) process used for transmitting the first message.

4. The method according to claim 1, further comprising:
waiting for retransmission of the first message during running of a second timer, wherein the second timer is started after a third timer expires, and the third timer is started after a feedback is performed for the first message.

5. The method according to claim 1, further comprising:
starting, by the first terminal, a first timer when a second condition is met, wherein the first terminal is in a DRX active state during running of the first timer, and the second condition comprises at least one of the following that:

a sixth timer expires, wherein the sixth timer is started after receiving the first message;

the sixth timer expires, wherein the sixth timer is started after a first channel resource, and the first channel resource is a Physical Sidelink Shared Channel (PSSCH) resource or a Physical Sidelink Control Channel (PSCCH) resource for sending the first message;

the sixth timer expires, wherein the sixth timer is started after a second channel resource, and the second channel resource is a Physical Sidelink Feedback Channel (PSFCH) resource corresponding to the first message;

after a second duration after the first message is received;

a third duration after the first terminal sends feedback information for the first message; or when the first terminal sends the feedback information for the first message.

6. The method according to claim 5, wherein the sixth timer being started after the first channel resource or after the second channel resource is configured by a network device.

7. The method according to claim 6, wherein the sixth timer being started after the first channel resource or after the second channel resource is configured by the network device through first configuration information, and the first configuration information is comprised in a resource pool configuration.

8. A wireless communication method, comprising:

sending, by a second terminal, a first message to a first terminal, wherein the first message is used for the first terminal to decode Sidelink Control Information (SCI) in the first message to obtain a target physical identifier in the first message and perform a Discontinuous Reception (DRX) operation according to the target physical layer identifier, wherein the target physical identifier is a layer 1 identifier, wherein in response to that the target physical layer identifier is consistent with a physical layer identifier of the first terminal, the first terminal starts a first timer, wherein the first terminal is in a DRX active state during running of the first timer;

starting, by the second terminal, a fourth timer in a case where a first condition is met; and during running of the fourth timer, retransmitting, by the second terminal, the first message or sending a second message.

9. The method according to claim 8, wherein the first condition comprises at least one of the following that:

a fifth timer expires, wherein the fifth timer is started after sending the first message;

after a first duration after sending the first message; or feedback information for the first message sent by the first terminal is received.

10. A terminal device, comprising:

a processor; and a memory storing instructions executable by the processor;

wherein when the instructions are executed by the processor, the terminal device is caused to:

receive a first message sent by a second terminal;

decode Sidelink Control Information (SCI) in the first message to obtain a target physical layer identifier in the first message, wherein the target physical layer identifier is a layer 1 identifier; and perform a Discontinuous Reception (DRX) operation according to the target physical layer identifier;

wherein performing the DRX operation according to the target physical layer identifier comprises:

in response to that the target physical layer identifier is consistent with a physical layer identifier of the terminal device, start a first timer, wherein the terminal device is in a DRX active state during running of the first timer.

11. The terminal device according to claim 10, wherein when the instructions are executed by the processor, the terminal device is further caused to perform at least one of:

after entering a sleep state, not performing data reception;

decoding data in the first message;

performing NACK feedback according to a decoding result of the first message; or waiting for retransmission of the first message.

12. The terminal device according to claim 11, wherein the waiting for retransmission of the first message corresponds to a sidelink between the first terminal and the second terminal; or wherein the waiting for retransmission of the first message corresponds to a Hybrid Automatic Repeat reQuest (HARQ) process used for transmitting the first message.

13. The terminal device according to claim 10, wherein when the instructions are executed by the processor, the terminal device is further caused to:

wait for retransmission of the first message during running of a second timer, wherein the second timer is started after a third timer expires, and the third timer is started after a feedback is performed for the first message.

14. The terminal device according to claim 10, wherein when the instructions are executed by the processor, the terminal device is further caused to:

start a first timer when a second condition is met, wherein the first terminal is in a DRX active state during running of the first timer, and the second condition comprises at least one of the following that:

a sixth timer expires, wherein the sixth timer is started after receiving the first message;

the sixth timer expires, wherein the sixth timer is started after a first channel resource, and the first channel resource is a Physical Sidelink Shared Channel (PSSCH) resource or a Physical Sidelink Control Channel (PSCCH) resource for sending the first message;

the sixth timer expires, wherein the sixth timer is started after a second channel resource, and the second channel resource is a Physical Sidelink Feedback Channel (PSFCH) resource corresponding to the first message;

after a second duration after the first message is received;

a third duration after the first terminal sends feedback information for the first message; or when the first terminal sends the feedback information for the first message.

15. The terminal device according to claim 14, wherein the sixth timer being started after the first channel resource or after the second channel resource is configured by a network device.

16. The terminal device according to claim 15, wherein the sixth timer being started after the first channel resource or after the second channel resource is configured by the network device through first configuration information, and the first configuration information is comprised in a resource pool configuration.

* * * * *